(12) United States Patent
Marchant et al.

(10) Patent No.: US 12,067,331 B2
(45) Date of Patent: Aug. 20, 2024

(54) SYSTEMS AND METHODS FOR CONTROL OF AN ACOUSTIC ENVIRONMENT

(71) Applicants: Google LLC, Mountain View, CA (US); Robert Marchant, Richmond (GB); Amelia Schladow, San Francisco, CA (US); David Matthew Jones, London (GB); Philip Roadley-Battin, Oakland, CA (US); Henry John Holland, London (GB)

(72) Inventors: Robert Marchant, Richmond (GB); Amelia Schladow, San Francisco, CA (US); David Matthew Jones, London (GB); Philip Roadley-Battin, Oakland, CA (US); Henry John Holland, London (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/041,152

(22) PCT Filed: Aug. 10, 2020

(86) PCT No.: PCT/US2020/045564
§ 371 (c)(1),
(2) Date: Feb. 9, 2023

(87) PCT Pub. No.: WO2022/035413
PCT Pub. Date: Feb. 17, 2022

(65) Prior Publication Data
US 2023/0315378 A1    Oct. 5, 2023

(51) Int. Cl.
*G06F 3/048*    (2013.01)
*G06F 3/0346*    (2013.01)
(Continued)

(52) U.S. Cl.
CPC ............ *G06F 3/165* (2013.01); *G06F 3/0346* (2013.01); *G06F 3/04847* (2013.01);
(Continued)

(58) Field of Classification Search
CPC .... G06F 3/165; G06F 3/0346; G06F 3/04847; G06F 3/0485; G06F 3/0488; H04R 1/1041; H04R 2420/07
See application file for complete search history.

(56) References Cited

U.S. PATENT DOCUMENTS 10,003,881 B2    6/2018    Cousins et al.
10,573,321 B1    2/2020    Smith et al.
(Continued)

FOREIGN PATENT DOCUMENTS

CN    104053107    9/2014
CN    109151642    1/2019
(Continued)

OTHER PUBLICATIONS

International Search Report for Application No. PCT/US2020/045564, mailed on Apr. 26, 2021, 2 pages.
(Continued)

*Primary Examiner* — Rashawn N Tillery
(74) *Attorney, Agent, or Firm* — DORITY & MANNING P.A.

(57) ABSTRACT

A computing system can implement a computer-implemented method for providing selective control of an acoustic environment of a user. The computer-implemented method can include determining a selected audio source of a plurality of audio sources in an environment of a user based at least in part on a selection user input at a peripheral device, where the peripheral device is in communication with the computing system. The computer-implemented method can include receiving a configuration user input at the peripheral
(Continued)

device, where the configuration user input is indicative of an intent to configure an audio characteristic associated with the selected audio source. The computer-implemented method can include, in response to receiving the configuration user input, configuring the audio characteristic associated with the selected audio source based at least in part on the configuration user input.

18 Claims, 8 Drawing Sheets

(51) Int. Cl.
  *G06F 3/04847* (2022.01)
  *G06F 3/0485* (2022.01)
  *G06F 3/0488* (2022.01)
  *G06F 3/16* (2006.01)
  *H04R 1/10* (2006.01)
(52) U.S. Cl.
  CPC .......... *G06F 3/0485* (2013.01); *G06F 3/0488* (2013.01); *H04R 1/1041* (2013.01); *H04R 2420/07* (2013.01)

(56) References Cited

U.S. PATENT DOCUMENTS

| | | | |
|---|---|---|---|
| 11,602,287 B2* | 3/2023 | Axo | ............... H04R 1/1083 |
| 2009/0076825 A1 | 3/2009 | Bradford et al. | |
| 2014/0115114 A1 | 4/2014 | Garmark et al. | |
| 2014/0294183 A1* | 10/2014 | Lee | ............... G06F 3/165 |
| | | | 381/56 |
| 2015/0195641 A1* | 7/2015 | Di Censo | ............. H04R 1/1083 |
| | | | 381/71.6 |
| 2016/0323666 A1* | 11/2016 | Ajmera | .................. H04S 7/30 |
| 2017/0094399 A1* | 3/2017 | Chandramohan | ...... H04R 5/033 |
| 2017/0188176 A1* | 6/2017 | Jang | .................. H04S 7/30 |
| 2017/0272867 A1 | 9/2017 | Zisapel et al. | |
| 2017/0359467 A1* | 12/2017 | Norris | .................. G10L 21/028 |
| 2018/0247646 A1 | 8/2018 | Meacham et al. | |
| 2023/0156401 A1* | 5/2023 | Marchant | ............... H04R 3/005 |
| | | | 381/92 |
| 2023/0419943 A1* | 12/2023 | Xu | .................. H04R 3/005 |

FOREIGN PATENT DOCUMENTS

| | | | | |
|---|---|---|---|---|
| CN | 109361984 | | 2/2019 | |
| CN | 109874096 | | 6/2019 | |
| CN | 110073673 A | * | 7/2019 | ......... G06K 9/00228 |
| CN | 110351624 | | 10/2019 | |
| CN | 107006053 B | * | 7/2020 | ......... G06F 3/04817 |
| WO | WO2015/103578 | | 7/2015 | |
| WO | WO2018/041801 | | 3/2018 | |

OTHER PUBLICATIONS

International Preliminary Report on Patentability for Application No. PCT/US2020/045564, mailed Feb. 23, 2023, 9 pages.
Chinese Search Report Corresponding to Application No. 2020801025705 on May 11, 2024.

* cited by examiner

SYSTEMS AND METHODS FOR CONTROL OF AN ACOUSTIC ENVIRONMENT

PRIORITY CLAIM

This application is based upon and claims the right of priority under 35 U.S.C. § 371 to International Application No. PCT/US2020/045564 filed on Aug. 10, 2020, which is incorporated by reference herein.

FIELD

The present disclosure relates generally to systems and methods for control of an acoustic environment. More particularly, the present disclosure relates to devices, systems, and methods that allow source-specific control of an acoustic environment of a user.

BACKGROUND

Personal computing devices, such as smartphones, have provided the ability to listen to audio based content on demand and across a wide variety of platforms and applications. For example, a person can listen to music and movies stored locally on their smartphones; stream movies, music, television shows, podcasts, and other content from a multitude of complementary and subscription-based services; access multimedia content available on the internet; etc. Additionally, advances in wireless speaker technology have allowed for users to listen to such audio content in a variety of environments and/or block sounds from an environment. However, in a typical implementation, a user only has a binary choice about whether audio information is presented to the user. For example, while listening to audio content in a noise-canceling mode, all external signals may be cancelled, including audio information the user would prefer to hear.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for providing selective control of an acoustic environment of a user. The computer-implemented method can include determining, by a computing system including one or more computing devices, a selected audio source of a plurality of audio sources in an environment of a user based at least in part on a selection user input at a peripheral device, where the peripheral device can be in communication with the computing system. The computer-implemented method can include receiving, by the computing system, a configuration user input at the peripheral device, where the configuration user input can be indicative of an intent to configure an audio characteristic associated with the selected audio source. The computer-implemented method can include, in response to receiving the configuration user input, configuring, by the computing system, the audio characteristic associated with the selected audio source based at least in part on the configuration user input.

Another example aspect of the present disclosure is directed to a computing system configured to provide selective control of an acoustic environment of a user. The computing system can include a computing device having a user interface component configured to receive user input from a user, one or more processors, and one or more memory devices storing computer-readable instructions that, when implemented by the one or more processors, cause the one or more processors to perform operations. The operations can include determining a selected audio source of a plurality of audio sources in an environment of the user based at least in part on a selection user input at the user interface component. The operations can include receiving a configuration user input at the user interface component, where the configuration user input can be indicative of an intent to configure an audio characteristic associated with the selected audio source. The operations can include, in response to receiving the configuration user input, configuring the audio characteristic associated with the selected audio source based at least in part on the configuration user input.

Another example aspect of the present disclosure is directed to a computing system including a peripheral device in communication with a user computing device. The peripheral device can include a user interface component configured to receive user input from a user, one or more processors, and one or more memory devices storing computer-readable instructions that, when implemented by the one or more processors, cause the one or more processors to perform operations. The operations can include receiving a selection user input from a user at the user interface component. The operations can include, in response to receiving the selection user input, causing the user computing device to determine a selected audio source of a plurality of audio sources in an environment of the user based at least in part on the selection user input. The operations can include receiving a configuration user input at the user interface component, where the configuration user input can be indicative of an intent to configure an audio characteristic associated with the selected audio source. The operations can include, in response to receiving the configuration user input, causing the user computing device to configure the audio characteristic associated with the selected audio source based at least in part on the configuration user input.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

A full and enabling description of the present disclosure, directed to one of ordinary skill in the art, is set forth in the specification, which makes reference to the appended figures, in which.

Figure 1A:
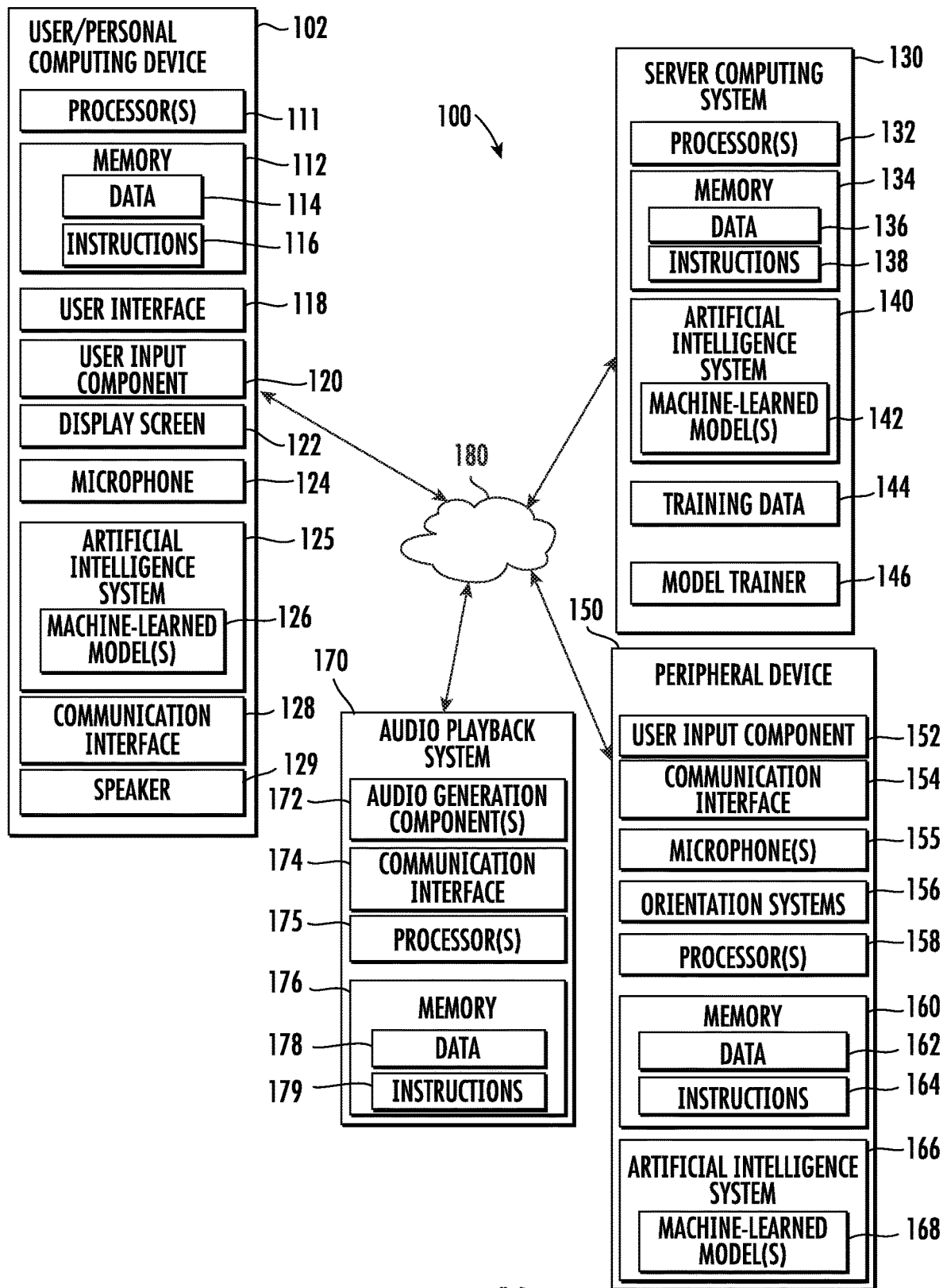
FIG. 1A depicts a block diagram of an example system that generates an audio presentation for a user via an artificial intelligence system according to example aspects of the present disclosure.

Reference numerals that are repeated across plural figures are intended to identify the same features in various implementations.

DETAILED DESCRIPTION

Generally, the present disclosure is directed to devices, systems, and methods which can provide a user with selective control over an acoustic environment of the user. For instance, the present disclosure can provide for selective control over an acoustic environment including audio signals from a user computing device (e.g., music, podcasts, video accompaniment audio, playback of the acoustic environment etc.) and/or sounds and/or other audio from an environment (e.g., a physical surrounding) of the user, such as ambient audio. Systems and methods can be provided that enable a user to configure an audio characteristic associated with a selected audio source of the acoustic environment. For example, systems and methods can accommodate a user in selecting a selected audio source from a plurality of audio sources in the acoustic environment, adjusting a selective filtering level (e.g., a volume level) associated with the selected audio source, muting and/or unmuting the selected audio source, and/or otherwise adjusting an audio characteristic representative of how audio from the selected audio source is provided to the user through an audio playback system (e.g., headphones, earphones). Additionally and/or alternatively, systems and methods can accommodate a user in configuring how audio from general, new, and/or otherwise previously unrecognized audio sources is provided to the user, such as a default audio treatment. For example, systems and methods can accommodate a user in selecting from one of a plurality of predetermined audio profiles or modes that affect which audio, if any, is provided to the user. Thus, a user can have increased control over the acoustic environment, which can provide increased user comfort/or and provide for a configurable level of user interaction with desired audio sources in the acoustic environment.

For instance, in various example implementations of the described technology, a computing system may be configured such that a user is able to provide a selection user input at a peripheral device for selecting an audio source of a plurality of audio sources in an environment of the user. The user can additionally provide, via the peripheral device, a configuration user input that is indicative of an intent to configure an audio characteristic associated with the selected audio source. Responsive to receiving the configuration user input, the computing system, which is in communication with the peripheral device, may configure the audio characteristic associated with the selected audio source based at least in part on the configuration user input. For instance, a degree of noise cancelling or amplification in accordance with the configuration user input may be applied to the selected audio source by an audio playback system.

Certain non-limiting implementations of the technology described herein may thus allow a user wearing one or more wireless earphones to control their acoustic environment in real-time, for instance, by directing a peripheral device (e.g. a wireless earphone case) at a particular source of audio, thereby to select the particular audio source. A configuration user input may then be provided via a user input interface, such as a touch interface, at the peripheral device in order to cause a computing system (e.g. the user's mobile device) in communication with both the wireless earphones and the peripheral device to modify the user's perception of the selected audio source. Various implementations of the subject technology may therefore provide a new, efficient and effective input mechanism for allowing a user to control their perception of the audio environment. Other benefits and advantages which also may be provided by various implementations of the subject technology are described below.

According to example aspects of the present disclosure, a computing system can be configured to provide selective control of an acoustic environment of a user. The computing system can include a user computing device. For example, the user computing device can be a personal computing device, such as a mobile device, such as, for example, a mobile phone, smartphone, personal digital assistant (PDA), pager, media player, and/or any other suitable mobile device, and/or combination thereof. For instance, in some implementations, the user computing device can be a mobile device including one or more user interfaces configured to interact with the user, such as one or more user input components, one or more display screens, one or more microphones, and/or other suitable user interfaces, and/or combination thereof, and/or other suitable electronic components. The user computing device can be configured to, among other functions, provide an audio environment to a user, such as, for example, by playing music for a user, providing telecommunications functions for a user, allowing a user to stream media, and/or any other suitable functions that can support providing audio to a user.

Additionally and/or alternatively, the computing system can include a peripheral device. The peripheral device can be in communication with the mobile device. For example, the peripheral device can operate in tandem with the user computing device to perform tasks to assist a user of the computing system. For instance, the peripheral device can receive and/or transmit control actions to and/or from the user computing device. The peripheral device can include one or more user interfaces, such as one or more user input components. For example, a user input, such as a gesture, such as, for example, a touch gesture, tap gesture, swipe gesture, scroll gesture (e.g., slow swiping), etc., can be performed at the peripheral device and/or processed at least in part by the peripheral device, causing the peripheral device and/or the user computing device and/or other components of the computing system (e.g., an audio playback system) to perform one or more tasks responsive to the user input. In some implementations, the user can point the peripheral device at an object to receive supplemental information about that object. Additionally and/or alternatively, the peripheral device can include other suitable user input components such as, for example, buttons, touch screens, lights (e.g., LEDs), haptic sensors, microphones, and/or any other suitable user input components.

In some implementations, the peripheral device can include one or more orientation systems. The orientation systems can be configured to determine an orientation of the peripheral device. For instance, the orientation systems can orient the peripheral device in three-dimensional space relative to a reference, such as a known initial configuration (e.g., calibration), pull of gravity, magnetic field, reference in visual data (e.g., an atmospheric line, person, feature tracking, etc.), and/or any other suitable reference, and/or combination thereof. As one example, the orientation systems can be or can include gyroscopic sensor(s), camera(s) and/or a feature tracking model, compass(es), magnetism sensor(s), gravity sensor(s), and/or any other suitable orientation systems, and/or combination thereof Additionally and/or alternatively, the peripheral device can be directed such that the peripheral device is considered to have a direction. For instance, the peripheral device can be shaped, marked, and/or include other suitable indicia (e.g., visible indicia, infrared indicia, etc.) to define a direction of the peripheral device. The orientation systems can additionally and/or alternatively be configured to track the direction of the peripheral device. For example, if the peripheral device is rod-shaped, elongated, etc. the direction of the peripheral device can be considered to be coincident with a longest dimension of the peripheral device. As another example, the direction of the peripheral device can be indicated by a front side of the peripheral device. As another example, the direction of the peripheral device can be indicated by a marked portion on the peripheral device (e.g., a printed, embossed, and/or otherwise marked arrow and/or other indicator). As another example, in some implementations, the peripheral device can include a sensor (e.g., a camera) on the peripheral device (e.g., a front surface and/or a front side of the peripheral device), which may additionally serve to mark the direction (e.g., front side) of the peripheral device.

The computing system can include an audio playback system configured to provide audio to the user. For example, in some implementations, the audio playback system can be or can include (e.g., wireless) headphones, earphones (e.g., earbuds), etc., such as wireless earphones associated with the peripheral device (e.g., a wireless earphone case). For instance, the audio playback system can be a standalone device (e.g., a pair of wireless earphones, wireless headphones, etc.) Additionally and/or alternatively, in some implementations, the user computing device and/or peripheral device can include (e.g., at least a portion of) the audio playback system, such as one or more processors associated with the audio playback system, instructions associated with the audio playback system, etc. The audio playback system can include one or more audio generation components (e.g., speakers) configured to generate audible sounds (e.g., sonic waves) based on an audio signal. As one example, the audio generation components can be incorporated into headphones, earphones, etc., such as wireless earphones, that are placed proximate an ear of a user during operation. The headphones, earphones, etc. can be configured to provide audio to the user, such as audio targeted at the user. For example, the audio can be overheard by the user and may not be overheard in a space proximate the user and/or at a certain distance from the user.

The audio playback system can be configured for partial and/or complete noise canceling functions. For example, the audio playback system and/or other components of the computing system (e.g., the peripheral device, user computing device) can include one or more ambient microphones configured to receive ambient audio from the user's environment. The audio playback system can be configured to emit sound waves that cancel and/or at least partially mitigate the ambient audio at the user's ear(s) and/or are otherwise undetectable to the user. In this way, the user is prevented from listening to the ambient audio, which can improve an experience of a user listening to audio from the audio playback system. Other suitable noise canceling technologies can be employed in accordance with the present disclosure.

According to example aspects of the present disclosure, a user can selectively control which audio signals (e.g., from which audio sources) are permitted through the noise canceling (and/or adjust volumes associated with the audio signals, among other audio characteristics) to provide a more complete control of the user's acoustic environment. For example, among other things, a user can control a level of noise canceling (e.g., incrementally from none to complete, such as a selective filtering level) associated with a particular audio source, audio direction, etc. As used herein, an "audio source" can refer to any suitable identification of audio source, such as, for example, an object (e.g., a person, vehicle, speaker system, etc.) present in an environment of a user, a directional audio signal (e.g., an audio signal that is strongest at one of a plurality of directed microphones), a class of object, and/or any other suitable audio source. Additionally and/or alternatively, in some implementations, the user can be provided with controls to adjust a default noise canceling level (e.g., selective filtering level) for each object, each class of object, all objects, etc.

Additionally and/or alternatively, the audio playback system can include various components (e.g., one or more processors) configured to prepare, filter, adjust volume of, and/or otherwise process an audio signal prior to being provided to the user. Some or all of the processing can be performed at the user computing device, peripheral device, and/or audio playback system. For example, the audio playback system can be or can include one or more wireless earphones. The user computing device may be configured to select and/or otherwise generate an audio signal (e.g., by one or more processors) to be provided to the user. The audio signal may be transmitted to the peripheral device (e.g., a wireless earphone case) and from the peripheral device to the audio playback system. Additionally and/or alternatively, the audio signal may be transmitted directly to the audio playback system. The audio signal may be entirely prepared for the user at the user computing device and/or may be processed at the peripheral device and/or the audio playback system. Noise canceling processing (e.g., cancelling sound wave generation) can be implemented at the audio playback system, the user computing device, and/or the peripheral device.

As one example, the peripheral device can be or can include a wireless earphone case. Additionally and/or alternatively, the audio playback system can be or can include wireless earphones. The wireless earphone case can be configured to house and/or charge wireless earphones when not in use (e.g., not positioned in a user's ear). For instance, the wireless earphones case can include one or more batteries, such as rechargeable batteries. As another example, the wireless earphones case can include one or more cavities configured to receive one or more wireless earphones. For instance, the one or more cavities can include one or more fastening elements (e.g., clamps, magnets, covers, latches, etc.) that may be configured to secure the wireless earphones when not in use. As another example, the one or more cavities can be configured to form electrical contact with the wireless earphones when the earphones are inserted into the cavities. For instance, the fastening elements can secure an electrical terminal on a surface of the earphones against an electrical terminal of the wireless earphones case. The electrical terminal may provide electrical contact for charging the wireless earphones (e.g., transporting power, charge, etc. from one or more batteries of the wireless earphones case to one or more batteries of the wireless earphones), signal transfer (e.g., providing signals, such as digital signals, to update software, firmware, etc. on the wireless earphones, transmit data to and/or from the wireless earphones, etc.) and/or perform other suitable functions. In addition to acting as a charging case for the wireless earphones, the wireless earphone case can be configured to act as a peripheral device. For instance, a user can point the wireless earphone case at an audio source, swipe through a plurality of detected audio sources, etc. to select an audio source and perform a gesture to adjust an audio characteristic of the selected audio source.

Additionally and/or alternatively, the peripheral device can be a standalone device, such as a remote, such as a device not configured to house wireless earphones and/or the audio playback system. Additionally and/or alternatively, the peripheral device, and/or portions thereof, can be incorporated into other suitable devices. Additionally and/or alternatively, the audio playback system can be or can include, for example, speakers, wired earphones, wired headphones, wireless headphones (e.g., not having an associated charging case, and/or other suitable audio playback systems.

The computing system can include one or more cameras. For instance, in some implementations, the one or more cameras can be included in the peripheral device. Additionally and/or alternatively, the one or more cameras can be included in the user computing device, the audio playback system (e.g., earbuds), and/or in additional devices (e.g., accessories). The one or more cameras can provide visual data (e.g., RGB pixel data) depicting an environment surrounding a user. For example, a camera included in the peripheral device can provide video data of at least a region within the environment at which the peripheral device (e.g., the camera) is pointed and/or surrounding regions. In some implementations, a ray associated with a center of a field of view of the one or more cameras can be coplanar with and/or parallel to a surface of the peripheral device on which a user input component is disposed and/or an edge of the peripheral device.

The computing system can include one or more microphones. For example, in some implementations, the peripheral device and/or user computing device can include one or more microphones. For example, in some implementations, the peripheral device can include at least a single microphone (e.g., an ambient microphone) configured to capture ambient audio from the acoustic environment of the user. As another example, a directional microphone array comprising a plurality of directed microphones can be included in the peripheral device. The plurality of directed microphones can each be associated with an angular range in front of the user. For example, the plurality of directed microphones can be disposed in a spherical configuration, a grid configuration, and/or any other suitable configuration to form an array. Thus, a coarse direction of an audio signal can be determined based at least in part on an angle associated with a directed microphone of the plurality of directed microphones, such as the directed microphone at which the signal is strongest (e.g., loudest). Additionally and/or alternatively, in some implementations, the coarse angle can be refined based on audio signal intensity at other directed microphones, such as directed microphones adjacent to the directed microphone at which the signal is strongest. The microphone(s) can be configured to receive audio from an environment of a user, such as ambient audio. For example, a sound wave incident at the microphone can be converted to an electrical signal (e.g., an audio signal) that is provided to the computing system (e.g., the user computing device).

The computing system can include one or more processors and/or one or more memory devices. The one or more memory devices can store computer-readable data that can be interpreted by the one or more processors. For example, the one or more memory devices can store one or more machine-learned models, such as, for example, object tracking and/or classification models, feature tracking models, sound separation models, sound classification models, and/or any other suitable machine-learned models and/or other models.

In some implementations, the computing system can include one or more object tracking models, such as feature tracking models. The object tracking models and/or feature tracking models can be configured to receive visual data (e.g., from one or more camera(s), such as RGB pixel image data, video data, etc.). The object and/or feature tracking models can identify and/or track (e.g., provide boundaries of, relative movement of, clustering of, etc.) objects/features in the visual data. For example, features can correspond to human-recognizable features (e.g., a portion of a building) and/or other suitable features that are present in the visual data. As another example, the object tracking model can be configured to output a class of an object, such as a class of a predetermined plurality of classes. The model(s) can be trained in any suitable method according to example aspects of the present disclosure. For example, the model(s) can be trained (e.g., through backpropagation) using training data that includes visual data labeled with known boundaries, movement, clusters, etc. of the visual data. As another example, the model(s) can be trained on visual data that is not labeled.

In some implementations, the computing system can include one or more sound separation models. For example, the sound separation model can be stored by the one or more memory devices. The sound separation model can be configured to isolate an audio signature associated with a unique audio source from an audio signal including audio signatures from a plurality of audio sources. For example, the sound separation model can decompose an audio signal captured from a single microphone capturing a plurality of sources (e.g., a plurality of directions) of ambient audio into a plurality of audio signals associated with each source (e.g., each direction). The sound separation model(s) can be trained (e.g., through backpropagation) using training data that includes audio data (e.g., training audio signals) such as an aggregate signal and corresponding decomposed signal(s). As another example, the sound separation model(s) can be trained on only aggregate signals and/or decomposed signals (e.g., in unsupervised learning).

In some implementations, the computing system can include a sound classification model. For example, the sound classification model can be stored by the one or more memory devices. The sound classification model can be configured to classify sounds (e.g., audio signals) from one or more audio sources, such as classifying the one or more audio sources as belonging to a class of a predetermined plurality of candidate classes. For example, the sound classification model can be configured to receive, as input to the sound classification model, an audio signal. The sound classification model can output, in response to receipt of the audio signal, a classification of the audio signal. For instance, the classification can indicate which of the predetermined plurality of candidate classes the audio signal (e.g., a source of the audio signal) belongs to. As one example, the classification can be or can include a plurality of probabilistic quantities (e.g., a probability vector) where each of the probabilistic quantities is indicative of a predicted likelihood of the audio signal belonging to a respective candidate class of the plurality of candidate classes.

The sound classification model can be machine-learned. For example, the sound classification model can be trained on training data including audio data recorded from a plurality of different types of audio sources. The sound classification model can learn, through training, to classify an input audio signal according to a predicted class of the source of the input audio signal. For example, the predetermined plurality of candidate classes can be learned through supervised learning, such as learned based on labels provided with the training data, and/or learned through unsupervised learning, such as representing dimensions of similarity in a plurality of training examples.

Additionally and/or alternatively, the one or more memory devices can store data including one or more instructions. The one or more instructions, when implemented, can cause the one or more processors to perform operations. For instance, the operations can be or can include a computer-implemented method for providing selective control of an acoustic environment. For example, the computer-implemented method can be implemented to control audio contributions from one or more audio sources in an environment of a user in accordance with example aspects of the present disclosure.

The operations and/or the computer-implemented method can include determining (e.g., by a computing system including one or more computing devices) a selected audio source of a plurality of audio sources in an environment of a user. For example, the selected audio source can be a direction of audio, such as all audio from a particular angular direction, spatial region, etc., and/or a particular audio generating object, class of object, etc. For example, an audio source may be a vehicle, a vehicle class, a person, a person class, an animal, a speaker system, a PA system, etc. The selected audio source can be an audio source (e.g., direction and/or audio generating object) that is selected by the user such that the user can adjust an audio characteristic associated with the selected audio source.

The selected audio source can be determined based at least in part on a selection user input at a peripheral device. The peripheral device can be in communication with the computing system. In some implementations, the peripheral device can be a wireless earphone case, remote, etc. The selection user input can be received at the peripheral device from the user. For example, the selection user input can be or can include one or more gestures, such as swipe gestures, tap gestures, shake gestures, etc. As another example, the selection user input can be or can include a user pointing the peripheral device at the selected audio source.

For instance, the peripheral device can include one or more user interfaces configured to receive user input. As an example, the peripheral device can include one or more touch-sensitive surfaces, such as, for example, a surface configured to receive and/or interpret gestures performed by the user at the touch-sensitive surface. As one example, the selection user input can be or can include a selection gesture, such as, for example, a swipe, shake, tap, double tap, flick, or any other suitable gesture. As an example, in some implementations, the user can swipe in one or more directions (e.g., left and/or right) to cycle through a plurality of recognized audio sources in the environment. For example, if the computing system is aware (e.g., through one or more sensors of the computing system, sound isolation and/or classification, etc.) of a plurality of audio sources, the user can cycle through the plurality of audio sources by swiping (e.g., or performing other suitable selection user input) at the peripheral device. As the user cycles through the plurality of audio sources, the user can be provided with visual and/or audial feedback on a current source of the plurality of audio sources. For example, in some implementations, an audial signal describing the current source (e.g., a voice signal descriptive of, for example, a class, direction, and/or other characteristic of the source) can be provided to the user, such as discreetly provided to the user through an audio playback system (e.g., earphones). Additionally and/or alternatively, a visual signal (e.g., text and/or picture(s) describing the source) can be provided on a display screen of a computing device (e.g., a mobile device) of the user.

As another example, the peripheral device can include one or more orientation systems, such as a camera, gyroscopic sensor, etc. The user can interact with the peripheral device using the one or more orientation systems to select a selected audio source. For example, in some implementations, the user can point the peripheral device, such as an indicating portion of the peripheral device, such as a longest dimension of the peripheral device, a marked portion of the peripheral device, etc., such that the peripheral device is directed at the selected audio source. For example, the selection user input can be or can include directing the peripheral device towards the selected audio source.

The computing system can determine the selected audio source based on understanding of the environment of the user. For example, the computing system can identify the selected audio source based on a direction associated with the selected audio source. As an example, in some implementations, such as implementations where the audio source includes directional audio, the computing system can determine that the selected audio source includes all audio from a region indicated by the direction of the peripheral device (e.g., an angular direction based one or more axes defined by, for instance, the user, the ground, a building or other object in the environment, etc.).

For instance, in some implementations, such as prior to selecting the selected audio source, the computing system can determine and/or identify the plurality of audio sources in the environment. For example, the computing system can associate an audio source of the plurality of audio sources with objects and/or features in visual data, isolated and/or separated audio signals, unique audio signals at a directed/directional microphone, etc. For example, in some implementations, multitype data including visual data, directed microphone audio data, etc. can be used to increase confidence (e.g., a confidence score) associated with a predicted audio source.

As another example, in some implementations, such as implementations including one or more cameras, such as a camera on the peripheral device, the computing system can determine a selected audio source based on an object (e.g., a boundary provided by an object classification and/or tracking model) in visual data (e.g., images, video, etc.) from cameras. For example, if the peripheral device includes a camera that is directed towards the selected audio source, the computing system may determine the selected audio source to be the object nearest a center of the visual data (e.g., as indicated by a bounding box surrounding the object). As another example, the computing system can determine the selected audio source by comparing a direction indicated by the peripheral device to visual and/or audial data from sensors not on the peripheral device, such as sensors on a mobile device, wearable accessory, etc.

Additionally and/or alternatively, the operations and/or the computer-implemented method can include determining (e.g., by the computing system) an audio contribution from the selected audio source to an acoustic environment of the user. For example, the computing system can identify an audio contribution, such as an audio signal and/or contribution to an (e.g., aggregate) audio signal. The audio contribution can be an electrical audio signal (e.g., an analog and/or digital information signal), such as a signal from only the selected audio source (e.g., isolated by a sound separation model) and/or an impact of an audio source on an audio signal, such as an audio signal containing data from a plurality of audio sources.

As one example, the computing system can select an audio signal of a plurality of directional audio signals from a directional microphone array based on the selected audio source. For example, a directional audio signal having a direction corresponding to (e.g., nearest) a direction of the peripheral device can be determined as the audio contribution. As another example, a directional audio signal having a direction corresponding to a direction between the peripheral device and selected audio source (e.g., in visual data) can be determined as the audio contribution.

Additionally and/or alternatively, the operations and/or the computer-implemented method can include receiving (e.g., by the computing system) a configuration user input at the peripheral device. For example, the configuration user input can be or can include a gesture, such as a swipe gesture, tap gesture, shake gesture, and/or any other suitable gesture, and/or combination thereof. The configuration user input can be received by one or more user interface components (e.g., a touch-sensitive surface) of the peripheral device. As an example, in some implementations, a configuration user input can be or can include an up swipe and/or a down swipe gesture. As another example, in some implementations, a configuration user input can be or can include a double tap gesture.

The configuration user input can be indicative of an intent to configure an audio characteristic associated with the selected audio source. For example, the audio characteristic can be a selective filtering level, such as a degree, percentage, etc. of which the selected audio source is filtered, noise cancelled, etc. from the acoustic environment of the user. For example, the acoustic characteristic (e.g., selective filtering level) can be indicative of a relative volume of the selected audio source. As one example, the audio characteristic can be or can include a selective filtering level of the selected audio source. The selective filtering level can be or can include a degree of noise cancelling performed by an audio playback system. As another example, the audio characteristic can be or can include a filter (e.g., a frequency filter), distortion (e.g., frequency distortion), a pause duration, muted status, and/or any other suitable audio characteristic, and/or combination thereof Additionally and/or alternatively, the operations and/or the computer-implemented method can include, in response to receiving the user input, configuring (e.g., by the computing system) the audio characteristic associated with the selected audio source based at least in part on the configuration user input. For example, the configuration user input can be or can include gestures known to the user and/or recognized by the computing system as controlling an audio characteristic in a predictable manner. The computing system (e.g., the user computing device) can process the configuration user input and adjust the audio characteristic based on, for example, a type and/or other characteristics of the configuration user input. The use of a peripheral device can allow for discreet and/or nonobtrusive performance of the configuration user input, such as in addition to increased user convenience, which can increase user comfort and/or efficiency at selectively controlling the user's audio environment.

As one example, it can be known to a user that, for example, an up swipe gesture increases relative volume of (e.g., reduces a noise cancelling level associated with) an audio source and, similarly, a down swipe gesture decreases relative volume of the audio source. Thus, a user wishing to increase relative volume of an audio source in the user's acoustic environment may perform an up swipe gesture and/or a user wishing to decrease relative volume of an audio source in the user's acoustic environment may perform a down swipe gesture. As another example, it can be known to a user that, for example, a double tap gesture will toggle muting and/or unmuting an audio source in the user's acoustic environment, such as while maintaining relative volume upon unmute. Thus, a user wishing to (e.g., temporarily and/or permanently) mute an audio source may perform a double tap gesture as a configuration user input.

The systems and methods of the present disclosure can provide a number of technical effects and benefits. For example, various implementations of the disclosed technology may improve the efficiency of conveyance of audio information to the user. For instance, certain implementations may allow more information to be provided to the user, while avoiding some drawbacks associated with entirely blocking a user's acoustic environment, such as potential missed important events.

In addition or alternatively, certain implementations may reduce unnecessary user distraction, thereby enhancing the safety for a user. For example, the devices, systems, and methods of the present disclosure can allow for audio information to be conveyed to a user concurrently with the user performing other tasks, such as driving, etc. Moreover, in some implementations, audio from a user's acoustic environment can be filtered, muted, adjusted, etc. prior to being provided to the user and with the user's express control, such that the user can control the acoustic environment based on the user's needs or desires.

Various implementations of the devices, systems, and methods of the present disclosure may enable the wearing of head-mounted speaker devices (e.g., earphones) without impairing the user's ability to operate effectively in the real world. For instance, desired sounds in the real world may be conveyed to the user while undesired sounds (e.g., from undesired audio sources) can be blocked from being conveyed to the user.

The systems and methods of the present disclosure also provide improvements to computing technology. In particular, a computing system, such as a personal user device, can determine a selected audio source of a plurality of audio sources in an environment of a user based at least in part on a selection user input at a peripheral device. The computing system can further receive a configuration user input at the peripheral device. The computing system can further, in response to receiving the configuration user input, configure the audio characteristic associated with the selected audio source based at least in part on the configuration user input.

With reference now to the FIGS., example implementations of the present disclosure will be discussed in further detail.

FIG. 1 depicts an example system for generating an audio presentation for a user according to example aspects of the present disclosure. The system 100 can include a computing device 102 (e.g., a user/personal/mobile computing device such as a smartphone), a server computing system 130, a peripheral device 150 (e.g., an earphone case device), and/or an audio playback system 170 (e.g., earphones, such as wireless earphones). In some implementations, the computing device 102 can be a wearable computing device (e.g., smartwatch, earphone headphones, etc.). In some implementations, the peripheral device 150 can be a wearable device (e.g., earphone headphones). In some implementations, the audio playback system 170 can be a wearable computing device (e.g., earphones).

The computing device 102 can include one or more processors 111 and a memory 112. The one or more processors 111 can be any suitable processing device (e.g., a processor core, a microprocessor, an ASIC, a FPGA, a controller, a microcontroller, etc.) and can be one processor or a plurality of processors that are operatively connected. The memory 112 can include one or more non-transitory computer-readable storage mediums, such as RAM, ROM, EEPROM, EPROM, flash memory devices, magnetic disks, etc., and combinations thereof. In some implementations, the memory can include temporary memory, such as an audio buffer, for temporary storage of visual and/or audio signals (e.g., treated signals). The memory 112 can store data 114 and instructions 116 which can be executed by the processor 111 to cause the user computing device 102 to perform operations.

The computing device 102 can include one or more user interfaces 118. The user interfaces 118 can be used by a user to interact with the user computing device 102, such as to provide user input (e.g., control gestures), such as selecting a selected audio source, adjusting an audio characteristic, etc.

The computing device 102 can also include one or more user input components 120 that receive user input. For example, the user input components 120 can be a touch-sensitive component (e.g., a touch-sensitive display screen 118 or a touch pad) that is sensitive to the touch of a user input object (e.g., a finger or a stylus). In some implementations, the touch-sensitive component can serve to implement a virtual keyboard. Other example user input components 120 include one or more buttons, a traditional keyboard, or other means by which a user can provide user input. The user input components 120 can allow for a user to provide user input, such as via a user interface 120 or in response to information displayed in a user interface 120.

The computing device 102 can also include one or more display screens 122. The display screens 122 can be, for example, display screens configured to display various information to a user, such as via the user interfaces 118. In some implementations, the one or more display screens 122 can be touch-sensitive display screens capable of receiving a user input.

The computing device 102 can further include one or more microphones 124. The one or more microphones 124 can be, for example, any type of audio sensor and associated signal processing components configured to generate audio signals associated with a user's surrounding environment. For example, ambient audio, such as a restaurant din, passing vehicle noises, etc. can be received by the one or more microphones 124, which can generate audio signals based on the surrounding environment of the user.

According to another aspect of the present disclosure, the computing device 102 can further include an artificial intelligence (AI) system 125 comprising one or more machine-learned models 126. In some implementations, the machine-learned models 126 can be operable to analyze an acoustic environment of the user. For example, the acoustic environment can include audio signals played by the computing device 102 (e.g., by audio playback system 170) and/or signals external to the computing device 102 (e.g., ambient audio). For example, the computing device 102 can be configured to play various media files, and an associated audio signal can be analyzed by the one or more machine-learned models 126, as disclosed herein. In some implementations, the acoustic environment can include audio signals associated with a surrounding environment of the user. For example, one or more microphones 124 can obtain and/or generate audio signals associated with the surrounding environment of the user. The one or more machine-learned models 126 can be operable to analyze audio signals associated with the surrounding environment of the user.

In some implementations, the one or more machine-learned models 126 can be, for example, neural networks (e.g., deep neural networks) or other multi-layer non-linear models which output various information used by the artificial intelligence system. Example artificial intelligence systems 125 and associated machine-learned models 126 according to example aspects of the present disclosure will be discussed below with further reference to FIGS. 2A-2C.

The AI system 125 can be stored on-device (e.g., on the computing device 102). For example, the AI system 125 can be a local AI system 125.

The computing device 102 can further include a communication interface 128. The communication interface 128 can include any number of components to provide networked communications (e.g., transceivers, antennas, controllers, cards, etc.). In some implementations, the computing device 102 includes a first network interface operable to communicate using a short-range wireless protocol, such as, for example, Bluetooth and/or Bluetooth Low Energy, a second network interface operable to communicate using other wireless network protocols, such as, for example, Wi-Fi, and/or a third network interface operable to communicate over GSM, CDMA, AMPS, 1G, 2G, 3G, 4G, 5G, LTE, GPRS, and/or other wireless cellular networks.

The computing device 102 can also include one or more speakers 129. The one or more speakers 129 can be, for example, configured to audibly play audio signals (e.g., generate sounds waves including sounds, speech, etc.) for a user to hear. For example, the artificial intelligence system 125 can generate an audio presentation for a user, and the one or more speakers 129 can present the audio presentation to the user.

Referring still to FIG. 1, the system 100 can further include server computing system 130. The server computing system 130 can include one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

In some implementations, the server computing system 130 can store or include an AI system 140 that can include one or more machine-learned models 142. Example artificial intelligence systems 140 and associated machine-learned models 142 according to example aspects of the present disclosure will be discussed below with further reference to FIGS. 2A-C.

In some implementations, the AI system 140 can be a cloud-based AI system 140, such as a personal cloud AI system 140 unique to a particular user. The AI system 140 can be operable to generate an audio presentation for a user via the cloud-based AI system 140.

The server computing system 130 and/or the computing device 102 can include a model trainer 146 that trains the artificial intelligence systems 125/140/166 using various training or learning techniques, such as, for example, backwards propagation of errors. In some implementations, performing backwards propagation of errors can include performing truncated backpropagation through time. The model trainer 146 can perform a number of generalization techniques (e.g., weight decays, dropouts, etc.) to improve the generalization capability of the models being trained.

In particular, the model trainer 146 can train the one or more machine-learned models 126/142/168 based on a set of training data 144. The training data 144 can include, for example, training datasets generated by the AI systems 125/140/166. For example, as will be described in greater detail herein, the training data 144 can include various examples of data types processed by the machine-learned models 126/142/168 that may be labeled with expected outputs, such as visual data (e.g., visual data labeled with object boundaries, classifications, etc.), audio data (e.g., isolated audio data, audio data labeled with classes, etc.) and/or other suitable training data.

In some implementations, the server computing device 130 can implement model trainer 146 to train new models or update versions on existing models on additional training data 144. As an example, the model trainer 146 can receive anonymized parameters associated with a local AI system 125 from one or more computing devices 102 and can generate a global AI system 140 using a federated learning approach. In some implementations, the global AI system 140 can be provided to a plurality of computing devices 102 to initialize a local AI system 125 on the plurality of computing devices 102.

The server computing device 130 can periodically provide the computing device 102 with one or more updated versions of the AI system 140 and/or the machine-learned models 142. The updated AI system 140 and/or machine-learned models 142 can be transmitted to the user computing device 102 via network 180.

The model trainer 146 can include computer logic utilized to provide desired functionality. The model trainer 146 can be implemented in hardware, firmware, and/or software controlling a general purpose processor. For example, in some implementations, the model trainer 146 includes program files stored on a storage device, loaded into a memory 112/134 and executed by one or more processors 111/132. In other implementations, the model trainer 146 includes one or more sets of computer-executable instructions that are stored in a tangible computer-readable storage medium such as RAM hard disk or optical or magnetic media.

In some implementations, any of the processes, operations, programs, applications, or instructions described as being stored at or performed by the server computing device 130 can instead be stored at or performed by the computing device 102 in whole or in part, and vice versa. For example, as shown, a computing device 102 can include a model trainer 146 configured to train the one or more machine-learned models 126 stored locally on the computing device 102.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Referring still to FIG. 1, system 100 can further include one or more peripheral devices 150. In some implementations, the peripheral device 150 can be a storage case (e.g., a charging case) for a wearable speaker device, such as the audio playback system 170, such as an earphone device, which can communicatively couple to the computing device 102.

The peripheral device 150 can include one or more user input components 152 that are configured to receive user input. The user input component(s) 152 can be configured to receive a user interaction indicative of a user request (e.g., a selection of a selected audio source, a desired configuration of an audio characteristic, etc.). For example, the user input components 120 can be a touch-sensitive component (e.g., a touch pad) that is sensitive to the touch of a user input object (e.g., a finger or a stylus). Other example user input components 152 include one or more buttons, switches, or other means by which a user can provide user input. The user input components 152 can allow for a user to provide user input, such as to request one or more semantic entities be displayed.

The peripheral device 150 can further include a communication interface 154. The communication interface 154 can include any number of components to provide networked communications (e.g., transceivers, antennas, controllers, cards, etc.). In some implementations, the peripheral device 150 includes a first network interface operable to communicate using a short-range wireless protocol, such as, for example, Bluetooth and/or Bluetooth Low Energy, a second network interface operable to communicate using other wireless network protocols, such as, for example, Wi-Fi, and/or a third network interface operable to communicate over GSM, CDMA, AMPS, 1G, 2G, 3G, 4G, 5G, LTE, GPRS, and/or other wireless cellular networks.

The peripheral device 150 can further include one or more microphones 155. The one or more microphones 155 can be, for example, any type of audio sensor and associated signal processing components configured to generate audio signals associated with a user's surrounding environment. For example, ambient audio, such as a restaurant din, passing vehicle noises, etc. can be received by the one or more microphones 155, which can generate audio signals based on the surrounding environment of the user.

For example, in some implementations, the peripheral device 150 can include at least a single microphone 155 (e.g., an ambient microphone) configured to capture ambient audio from the acoustic environment of the user. As another example, a directional microphone array comprising a plurality of directed microphones can be included as the one or more microphones 155 in the peripheral device 150. The plurality of directed microphones 155 can each be associated with an angular range in front of the user. For example, the plurality of directed microphones 155 can be disposed in a spherical configuration, a grid configuration, and/or any other suitable configuration to form an array. Thus, a coarse direction of an audio signal can be determined based at least in part on an angle associated with a directed microphone of the plurality of directed microphones 155, such as the directed microphone at which the signal is strongest (e.g., loudest). Additionally and/or alternatively, in some implementations, the coarse angle can be refined based on audio signal intensity at other directed microphones 155, such as directed microphones 155 adjacent to the directed microphone 155 at which the signal is strongest. The microphone(s) 155 can be configured to receive audio from an environment of a user, such as ambient audio. For example, a sound wave incident at the microphone 155 can be converted to an electrical signal (e.g., an audio signal) that is provided to the computing system 100, such as the user computing device 102, audio playback system 170, etc.

In some implementations, the peripheral device can include one or more orientation systems 156. The orientation systems 156 can be configured to determine an orientation of the peripheral device 150. For instance, the orientation systems 156 can orient the peripheral device 150 in three-dimensional space relative to a reference, such as a known initial configuration (e.g., calibration), pull of gravity, magnetic field, reference in visual data (e.g., an atmospheric line, person, feature tracking, etc.), and/or any other suitable reference, and/or combination thereof. As one example, the orientation systems 156 can be or can include gyroscopic sensor(s), camera(s) and/or a feature tracking model, compass(es), magnetism sensor(s), gravity sensor(s), and/or any other suitable orientation systems, and/or combination thereof.

Additionally and/or alternatively, the peripheral device 150 can be directed such that the peripheral device 150 is considered to have a direction. For instance, the peripheral device 150 can be shaped, marked, and/or include other suitable indicia (e.g., visible indicia, infrared indicia, etc.) to define a direction of the peripheral device 150. The orientation systems 156 can additionally and/or alternatively be configured to track the direction of the peripheral device 150. For example, if the peripheral device 150 is rod-shaped, elongated, etc. the direction of the peripheral device 150 can be considered to be coincident with a longest dimension of the peripheral device 150. As another example, the direction of the peripheral device 150 can be indicated by a front side of the peripheral device 150. As another example, the direction of the peripheral device 150 can be indicated by a marked portion on the peripheral device 150 (e.g., a printed, embossed, and/or otherwise marked arrow and/or other indicator). As another example, in some implementations, the peripheral device 150 can include a visible portion of orientation system 156, such as a visible sensor (e.g., a camera), on the front of the peripheral device 150, which may additionally serve to mark the direction (e.g., front side) of the peripheral device 150.

The peripheral device 150 can include one or more processors 158 and a memory 160. The one or more processors 158 can be any suitable processing device (e.g., a processor core, a microprocessor, an ASIC, a FPGA, a controller, a microcontroller, etc.) and can be one processor or a plurality of processors that are operatively connected. The memory 160 can include one or more non-transitory computer-readable storage mediums, such as RAM, ROM, EEPROM, EPROM, flash memory devices, magnetic disks, etc., and combinations thereof. The memory 160 can store data 162 and instructions 164 which are executed by the processor 158 to cause the peripheral device 150 to perform operations.

In some implementations, the memory 160 can additionally and/or alternatively store and/or the peripheral device can otherwise include an AI system 166 that can include one or more machine-learned models 168. Example artificial intelligence systems 166 and associated machine-learned models 168 according to example aspects of the present disclosure will be discussed below with further reference to FIGS. 2A-2C. In some implementations, the AI system 166 can be incorporated into or otherwise a part of the AI systems 125/140. For example, The AI systems 125/140/166 can be communicatively coupled and work together to generate an audio presentation for a user. As an example, various machine-learned models 124/142/168 can be stored locally as a part of an AI system 125/140/166 on the associated devices/systems 102/130/150, and the machine-learned models 124/142/168 can collectively provide selective control of an acoustic environment of a user.

The AI system 166 can be trained or otherwise provided to the peripheral device 150 by the computing device 102 and/or server computing system 130, as described herein.

The computing system 102 can include an audio playback system 170 configured to provide audio to a user. For example, in some implementations, the audio playback system 170 can be or can include (e.g., wireless) headphones, earphones (e.g., earbuds), etc., such as wireless earphones associated with the peripheral device 150 (e.g., a wireless earphone case). For instance, the audio playback system 170 can be a standalone device (e.g., a pair of wireless earphones, wireless headphones, etc.) Additionally and/or alternatively, in some implementations, the user computing device 102 and/or peripheral device 150 can include (e.g., at least a portion of) the audio playback system 170, such as one or more processors (e.g., processors 111/132/158) operating in tandem with and/or alternatively to processor(s) 175 associated with and/or disposed within the audio playback system 170, instructions (e.g., instructions 116/138/164) associated with the audio playback system 170, etc. The audio playback system 170 can include one or more audio generation components (e.g., speakers) 172 configured to generate audible sounds (e.g., sonic waves) based on an audio signal. As one example, the audio generation components 172 can be incorporated into headphones, earphones, etc., such as wireless earphones, that are placed proximate an ear of a user during operation. The headphones, earphones, etc. can be configured to provide audio to the user, such as audio targeted at the user. For example, the audio can be overheard by the user and may not be overheard in a space proximate the user and/or at a certain distance from the user.

The audio playback system 170 can be configured for partial and/or complete noise canceling functions. For example, the audio playback system 170 and/or other components of the computing system 100 (e.g., the peripheral device 150, user computing device 102, etc.) can include one or more ambient microphones (e.g., microphones 124/155) configured to receive ambient audio from the user's environment. The audio playback system 170 can be configured to emit (e.g., by audio generation components 172) sound waves that cancel and/or at least partially mitigate the ambient audio at the user's ear(s) and/or are otherwise undetectable to the user. In this way, the user is prevented from listening to the ambient audio, which can improve an experience of a user listening to audio from the audio playback system 170. Other suitable noise canceling technologies can be employed in accordance with the present disclosure.

According to example aspects of the present disclosure, a user can selectively control which audio signals (e.g., from which audio sources) are permitted through the noise canceling (and/or adjust volumes associated with the audio signals, among other audio characteristics) to provide a more complete control of the user's acoustic environment. For example, among other things, a user can control a level of noise canceling (e.g., incrementally from none to complete, such as a selective filtering level) associated with a particular audio source, audio direction, etc. As used herein, an "audio source" can refer to any suitable identification of audio source, such as, for example, an object (e.g., a person, vehicle, speaker system, etc.) present in an environment of a user, a directional audio signal (e.g., an audio signal that is strongest at one of a plurality of directed microphones), a class of object, and/or any other suitable audio source. Additionally and/or alternatively, in some implementations, the user can be provided with controls to adjust a default noise canceling level (e.g., selective filtering level) for each object, each class of object, all objects, etc.

Additionally and/or alternatively, the audio playback system 170 can include various components (e.g., one or more processors 175, data 178, instructions 179, etc.) configured to prepare, filter, adjust volume of, and/or otherwise process an audio signal prior to being provided to the user. Some or all of the processing can be performed at the user computing device 102, server computing device 130, peripheral device 150, and/or audio playback system 170 (e.g., by respective processors). For example, the audio playback system 170 can be or can include one or more wireless earphones. The user computing device 102 may be configured to select and/or otherwise generate an audio signal (e.g., by at least the one or more processors 111) to be provided to the user. The audio signal may be transmitted to the peripheral device 150 (e.g., a wireless earphone case) and from the peripheral device 150 (e.g., after processing by processor(s) 158, in some implementations) to the audio playback system 170. Additionally and/or alternatively, the audio signal may be transmitted directly to the audio playback system 170 from the user computing device 102. The audio signal may be entirely prepared for the user at the user computing device 102 and/or may be processed at the peripheral device 150 and/or the audio playback system 170, such as by respective processors 111/158/175. Noise canceling processing (e.g., cancelling sound wave generation) can be implemented at the audio playback system 170, the user computing device 102, and/or the peripheral device 150.

The audio playback system 170 can further include a communication interface 174. The communication interface 174 can include any number of components to provide networked communications (e.g., transceivers, antennas, controllers, cards, etc.). In some implementations, the audio playback system 170 includes a communication interface 174 operable to communicate using a short-range wireless protocol, such as, for example, Bluetooth and/or Bluetooth Low Energy, such as to communicate with peripheral device 150 and/or user computing device 102.

The audio playback system 170 can include one or more processors 175 and a memory 160. The one or more processors 175 can be any suitable processing device (e.g., a processor core, a microprocessor, an ASIC, a FPGA, a controller, a microcontroller, etc.) and can be one processor or a plurality of processors that are operatively connected. The memory 176 can include one or more non-transitory computer-readable storage mediums, such as RAM, ROM, EEPROM, EPROM, flash memory devices, magnetic disks, etc., and combinations thereof. The memory 176 can store data 178 and instructions 179 which are executed by the processor 175 to cause the audio playback system 170 to perform operations (e.g., audio playback, noise cancelling, wireless connection establishing, etc.).

Figure 1B:
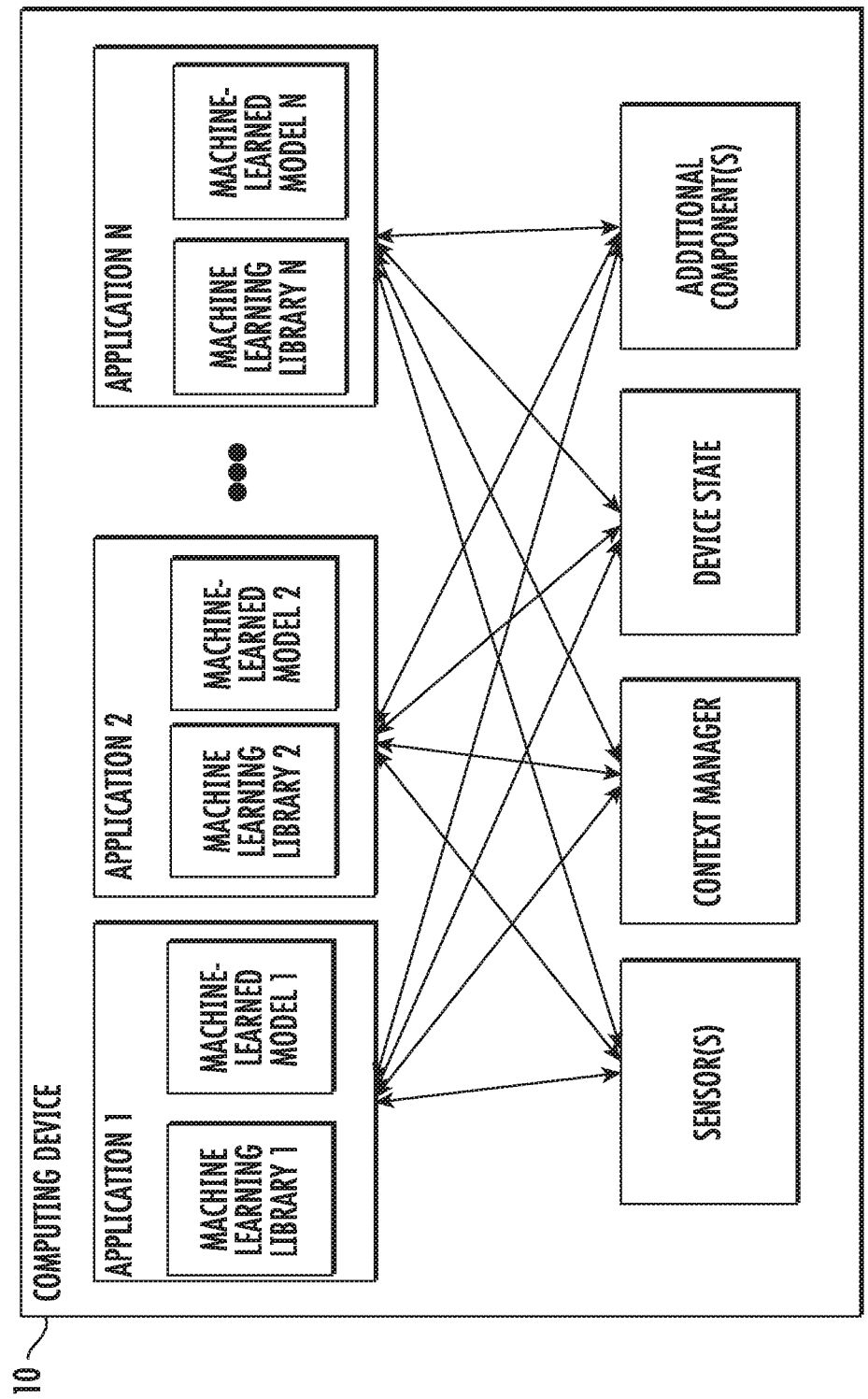
FIG. 1B depicts a block diagram of an example computing device according to example aspects of the present disclosure.

FIG. 1B depicts a block diagram of an example computing device 10 that performs selective control of an acoustic environment according to example implementations of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
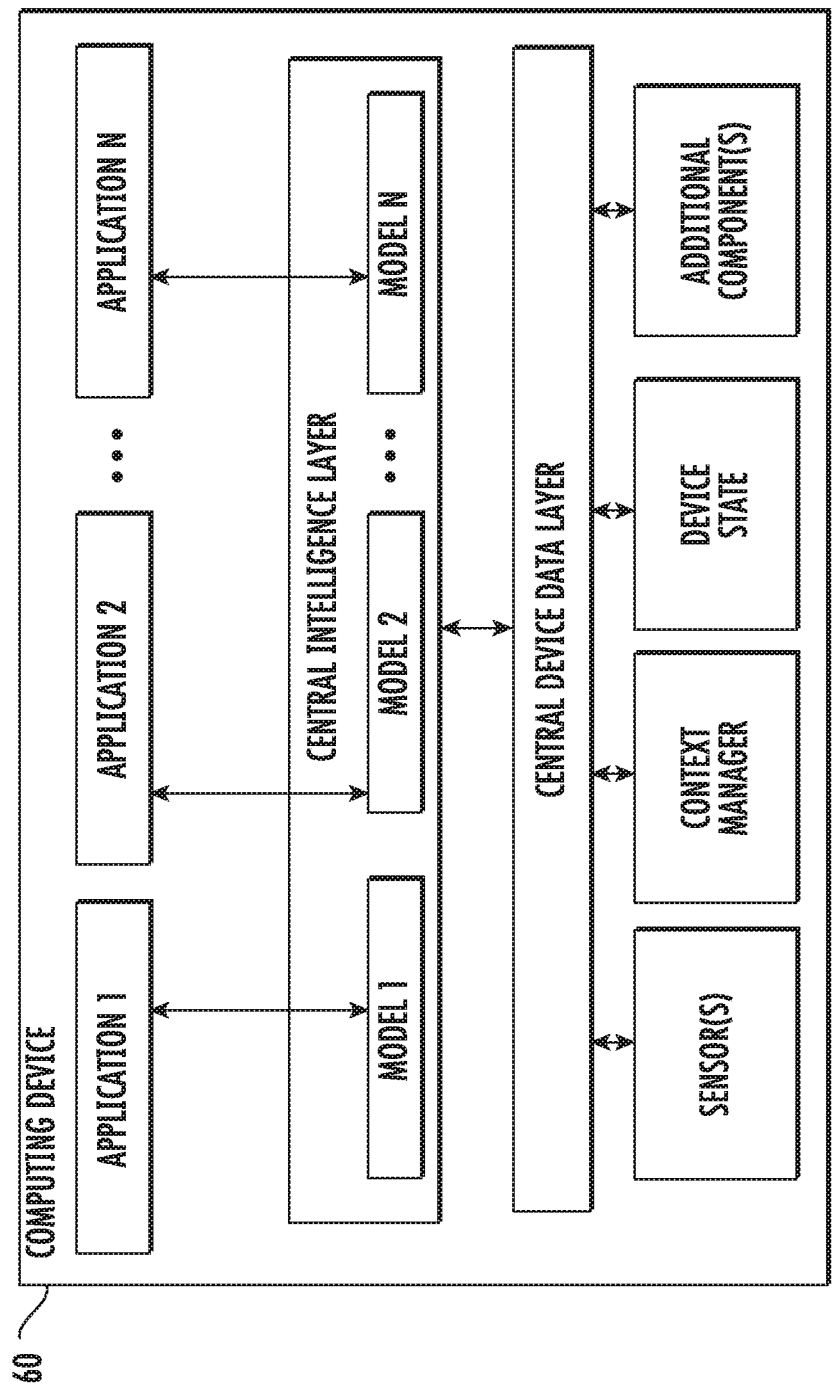
FIG. 1C depicts a block diagram of an example computing device according to example aspects of the present disclosure.

FIG. 1C depicts a block diagram of an example computing device 50 that performs selective control of an acoustic environment according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2A:
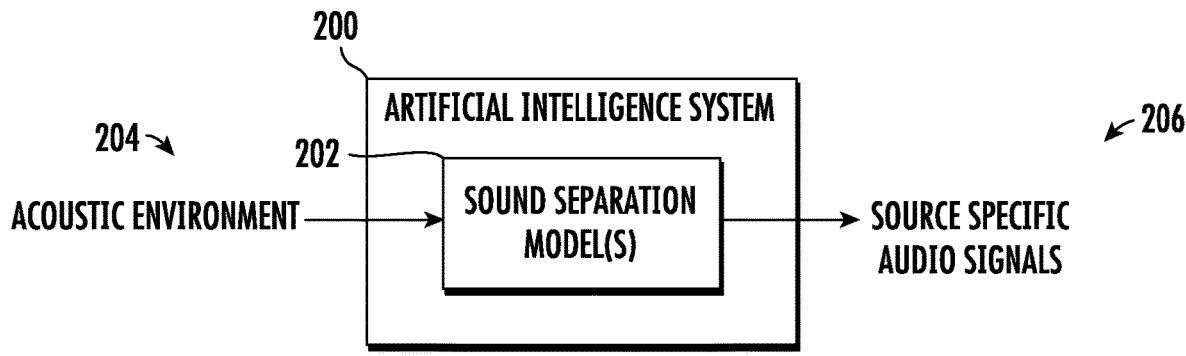
FIG. 2A depicts a block diagram of an example artificial intelligence system according to example aspects of the present disclosure.

FIG. 2A depicts a block diagram of an example AI system 200 including one or more machine-learned models 202 (e.g., sound separation models) according to example aspects of the present disclosure. In some implementations, the AI system 200 can be stored on a computing device/system, such as a computing device 102, a computing system 130, and/or a peripheral device 150 depicted in FIG. 1. The AI system 200 can be an AI system configured to perform sound separation. In some implementations, the AI system 200 is trained to receive data indicative of an acoustic environment 204 and provide source-specific audio signals 206. For example, the data indicative of the acoustic environment 204 can include audio signals playing for a user on the computing device/system (e.g., music, podcasts, audiobooks, etc.). The data indicative of the acoustic environment 204 can also include audio signals associated with the surrounding environment of the user (e.g., ambient audio). The source-specific audio signals 206 can be decomposed from the acoustic environment and represent an audio contribution of a particular audio source (e.g., a selected audio source and/or other audio sources) to the acoustic environment 204 (e.g., an aggregate audio signal).

As depicted in FIG. 2A, the data indicative of the acoustic environment 204 can be input into the AI system 200, such as into one or more machine-learned models 202 (e.g., sound separation models). The AI system 200 can generate one or more source-specific audio signals 206 based at least in part on the data indicative of the acoustic environment 204. For example, the source-specific audio signals 206 can be received as an output of the AI system 200 and/or the one or more machine-learned models 202.

For instance, in some implementations, the AI system 200 can include one or more sound separation models. The sound separation model(s) can be stored by one or more memory devices (e.g., memory 112/134/160 of FIG. 1A). The sound separation model(s) can be configured to isolate an audio signature associated with a unique audio source from an audio signal including audio signatures from a plurality of audio sources, such as the data indicative of an acoustic environment of the user 204. For example, the sound separation model can decompose an audio signal captured from a single microphone capturing a plurality of sources (e.g., a plurality of directions) of ambient audio into a plurality of source-specific audio signals 206 that are each associated with a particular source (e.g., each direction). The sound separation model(s) can be trained (e.g., through backpropagation) using training data that includes audio data (e.g., training audio signals) such as an aggregate signal and corresponding decomposed signal(s). As another example, the sound separation model(s) can be trained on only aggregate signals and/or decomposed signals (e.g., in unsupervised learning).

Figure 2B:
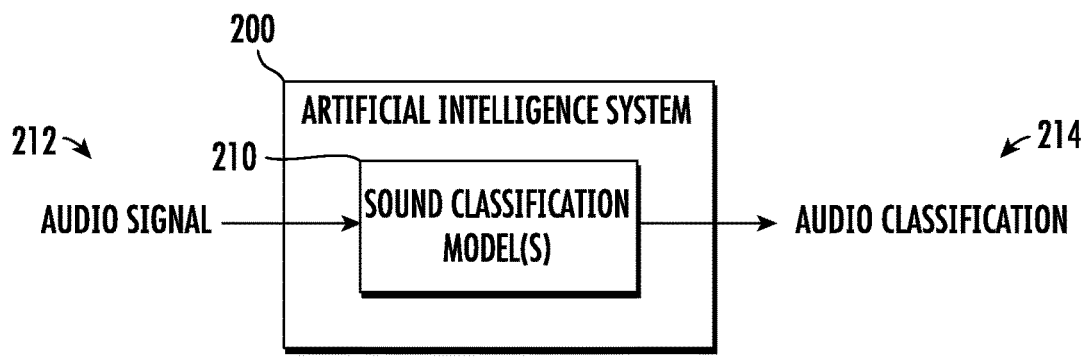
FIG. 2B depicts a block diagram of an example artificial intelligence system according to example aspects of the present disclosure.

FIG. 2B depicts a block diagram of an example AI system 200 including one or more machine-learned models 210 (e.g., sound classification models) according to example aspects of the present disclosure. In some implementations, the AI system 200 can be stored on a computing device/system, such as a computing device 102, a computing system 130, and/or a peripheral device 150 depicted in FIG. 1. The AI system 200 can be an AI system configured to perform sound classification. In some implementations, the AI system 200 is trained to receive data indicative of an audio signal 212 and provide an audio classification 214 of the audio signal. For example, the audio signal 212 can be or can include audio signals playing for a user on the computing device/system (e.g., music, podcasts, audiobooks, etc.). The audio signals 212 can also include audio signals associated with the surrounding environment of the user (e.g., ambient audio), such as an audio signal 212 representing an audio contribution to an acoustic environment from a particular audio source (e.g., a source-specific audio signal).

As depicted in FIG. 2B, the audio signal 212 can be input into the AI system 200, such as into one or more machine-learned models 210 (e.g., sound classification models). The AI system 200 can generate an audio classification 214 based at least in part on the audio signals 212. For example, the audio classification 214 can be received as an output of the AI system 200 and/or the one or more machine-learned models 210.

For instance, in some implementations, the AI system 200 can include one or more sound classification models 210. The sound classification model(s) 210 can be stored by one or more memory devices (e.g., memory 112/134/160 of FIG. 1A). The sound classification model(s) 210 can be configured to provide an audio classification 214 that classifies sounds (e.g., audio signals 212) from one or more audio sources, such as classifying the one or more audio sources as belonging to a class of a predetermined plurality of candidate classes. For example, the sound classification model(s) 210 can be configured to receive, as input to the sound classification model(s) 210, an audio signal 212. The sound classification model(s) 210 can output, in response to receipt of the audio signal, a classification of the audio signal (e.g., audio classification 214). For instance, the audio classification 214 can indicate which of the predetermined plurality of candidate classes the audio signal 212 (e.g., a source of the audio signal) belongs to. As one example, the audio classification 214 can be or can include a plurality of probabilistic quantities (e.g., a probability vector) where each of the probabilistic quantities is indicative of a predicted likelihood of the audio signal 212 belonging to a respective candidate class of the plurality of candidate classes.

The sound classification model(s) 210 can be machine-learned. For example, the sound classification model(s) 210 can be trained on training data including audio data recorded from a plurality of different types of audio sources. The sound classification model(s) 210 can learn, through training, to classify an input audio signal according to a predicted class of the source of the input audio signal. For example, the predetermined plurality of candidate classes can be learned through supervised learning, such as learned based on labels provided with the training data, and/or learned through unsupervised learning, such as representing dimensions of similarity in a plurality of training examples.

Figure 2C:
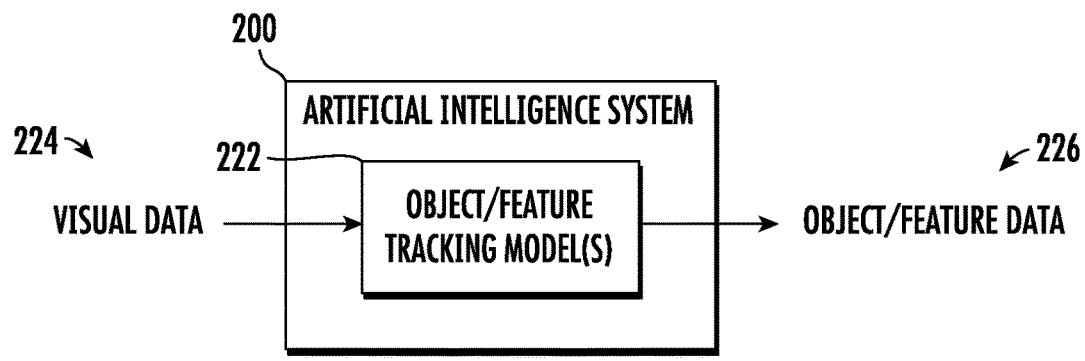
FIG. 2C depicts a block diagram of an example artificial intelligence system according to example aspects of the present disclosure.

FIG. 2C depicts a block diagram of an example AI system 200 including one or more machine-learned models 220 (e.g., object/feature tracking models) according to example aspects of the present disclosure. In some implementations, the AI system 200 can be stored on a computing device/system, such as a computing device 102, a computing system 130, and/or a peripheral device 150 depicted in FIG. 1. The AI system 200 can be an AI system configured to perform sound classification. In some implementations, the AI system 200 is trained to receive visual data 222 and provide object/feature data 224. For example, the visual data 222 can be or can include image and/or video data captured from one or more cameras, such as, for example, cameras on a peripheral device (e.g., a camera on a front side of the peripheral device). The object/feature data 224 can include data indicative of the presence of and/or type of one or more objects and/or features in the visual data 222, such as, for example, object boundaries and/or positions, feature boundaries and/or positions, object classifications, shape data, movement data (e.g., feature movement from a previous position), and/or other suitable object/feature data.

As depicted in FIG. 2C, the visual data 222 can be input into the AI system 200, such as into one or more machine-learned models 220 (e.g., object/feature tracking models). The AI system 200 can generate the object/feature data 224 based at least in part on the visual data 222. For example, the object/feature data can be received as an output of the AI system 200 and/or the one or more machine-learned models 220. For instance, in some implementations, the AI system 200 can include one or more object/feature tracking models 220. The object/feature tracking model(s) 220 can be stored by one or more memory devices (e.g., memory 112/134/160 of FIG. 1A).

The object tracking models and/or feature tracking models 220 can be configured to receive visual data 222 (e.g., from one or more camera(s), such as RGB pixel image data, video data, etc.). The object and/or feature tracking models 220 can identify and/or track (e.g., provide boundaries of, relative movement of, clustering of, etc.) objects/features in the visual data 222. For example, features can correspond to human-recognizable features (e.g., a portion of a building) and/or other suitable features that are present in the visual data. As another example, an object tracking model 220 can be configured to output a class of an object, such as a class of a predetermined plurality of classes. The model(s) 220 can be trained in any suitable method according to example aspects of the present disclosure. For example, the model(s) 220 can be trained (e.g., through backpropagation) using training data that includes visual data labeled with known boundaries, movement, clusters, etc. of the visual data. As another example, the model(s) 220 can be trained on visual data that is not labeled.

Figure 3:
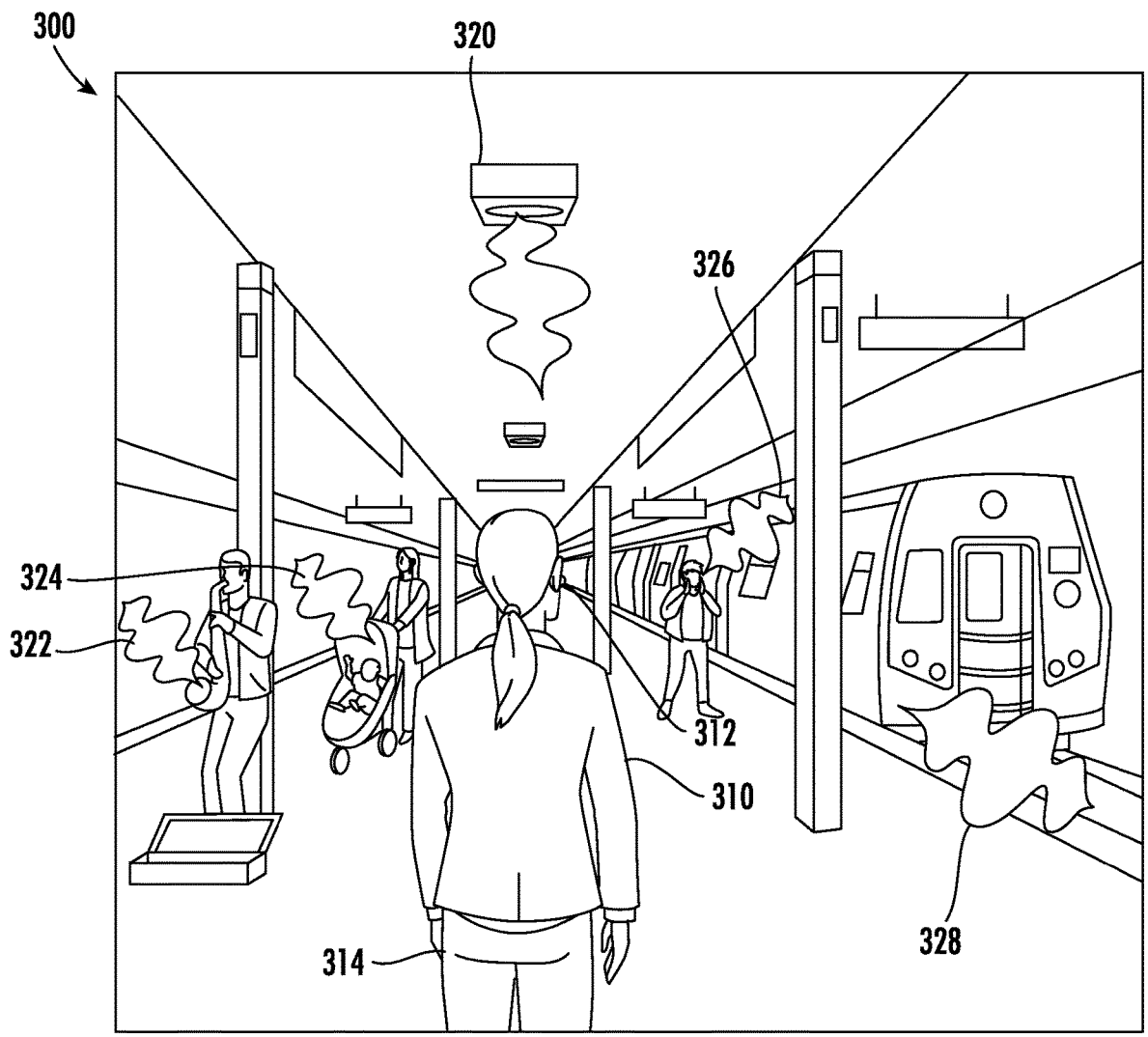
FIG. 3 depicts a graphical representation of an acoustic environment for a user according to example aspects of the present disclosure.

Referring now to FIG. 3, an example acoustic environment 300 for a user 310 is depicted. As shown, the user 310 is wearing an audio playback system 312 (e.g. earphones). In some implementations, the acoustic environment 300 can include audio content being played for the user 310, such as music streaming from the user's personal computing device to the audio playback system 312.

However, the acoustic environment 300 for the user 310 may also include additional audio signals, such as audio signals 320-328 associated with a surrounding environment of the user. Each of the audio signals 320-328 can be associated with a unique event. For example, as depicted, an audio signal 322 can be an audio signal generated by a musician on a loading platform of a train station. Another audio signal 324 can be an audio signal from a nearby child laughing. An audio signal 320 can be an announcement over a PA system, such as an announcement that a particular train is boarding. An audio signal 326 can be an audio signal from a nearby passenger shouting to get the attention of other members in his traveling party. An audio signal 328 can be an audio signal generated by a nearby train, such as audio signals generated by the train traveling on the tracks or a horn indicating the train is about to depart.

The cacophony of audio signals 320-328 in the surrounding environment of the user as well as any audio content playing for the user 310 may have the potential to overwhelm the user 310. Thus, in response, a user 310 desiring to listen to audio content on the user's personal device may use a noise cancelling mode to cancel the audio signals 320-328, thereby allowing only the audio content playing on the user's personal device to be presented to the user. However, this may cause the user 310 to miss important audio information, such as an announcement over a PA system 320 that the user's train is departing. Thus, in some situations, in order to ensure the user 310 does not miss important audio content, the user 310 may have to turn off the noise-cancelling mode or remove the wearable speaker device 312 altogether.

Further, even when the user 310 is able to listen to audio content, such as audio content playing on the user's personal device (e.g., smartphone), such audio content may be frequently interrupted by other events, such as audio signals associated with communications, notifications, and/or prompts provided by the user's personal device. In response, the user may select a "silent" mode in which any audio signals associated with on-device notifications aren't provided, but this could also cause the user to similarly miss important information, such as text messages from a spouse or notifications from a travel application about a travel delay.

Referring back to FIGS. 1 and 2A-2C, the computing system 100 and/or AI system 200 can intelligently curate the user's acoustic environment by providing selective control of the acoustic environment 300. For example, according to additional example aspects of the present disclosure, a user can select one of the audio sources 320-328 and control an audio characteristic associated with the audio sources 320-328. For example, the user can select audio sources 322-328 (e.g., individually), such as by performing a selection user input at a peripheral device, and control an audio characteristic, such as by performing a configuration user input at the peripheral device, to lower volume of (e.g., increase a filtering level associated with) and/or mute the selected audio sources 322-328. In this way, the audio playback system 312 can allow a user to enjoyably listen to audio without interruptions from the acoustic environment 300 while maintaining the user's ability to listen to desired audio sources in the acoustic environment 300, such as the PA system 320.

In some implementations, the peripheral device can be a handheld device and may be sized such that the peripheral device can be held in a hand of the user. Additionally, the peripheral device may be configured for discreet operation, to avoid imposing user inputs on an environment of the user. For example, the peripheral device can be configured to operate (e.g., at least partially) while in a pocket 314 of the user.

Figure 4:
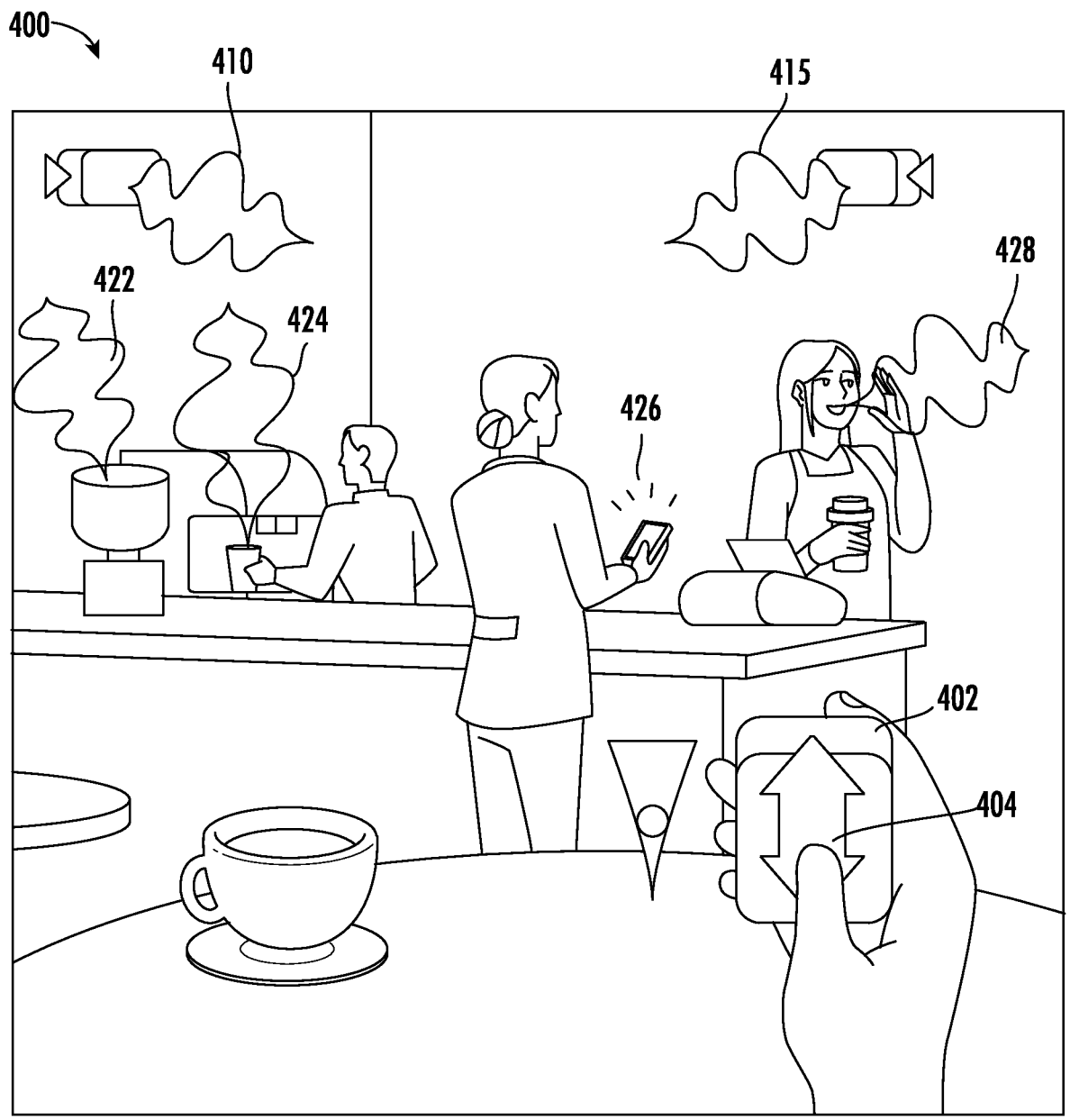
FIG. 4 depicts a graphical representation of an acoustic environment for a user according to example aspects of the present disclosure.

FIG. 4 depicts another example acoustic environment 400 of a user in accordance with example implementations of the present disclosure. For instance, the acoustic environment 400 can include various audio sources 410-428, such as, for example, PA systems 410 and 415, blender 422, espresso maker 424, electronic device 426, and cashier 428. Similar to the acoustic environment 300 of FIG. 3, a user can control the acoustic environment 400 in accordance with example aspects of the present disclosure. For example, the user can provide user input using peripheral device 402, such as a touch surface 404 of peripheral device 402. For example, the user can point peripheral device 402 (e.g., a front portion of peripheral device 402) at an audio source 410-428 to select a selected audio source. Additionally, the user can perform a user input at touch surface 404 (e.g., sliding a finger, stylus, etc. up and/or down the touch surface 404) to adjust an audio characteristic of one or more of the audio sources 410-428.

In some implementations, the peripheral device 402 can assist the user in configuring an audio characteristic for a plurality of audio sources, such as a plurality of audio sources having a similar or same class. For example, the peripheral device 402 and/or associated computing system (e.g., a mobile device of the user) may be configured to classify (e.g., by an object classification model) some or all of the audio sources 410-428. For example, the PA system 410 and PA system 415 may have a similar class. Thus, in some implementations, the user may configure an audio characteristic associated with both PA system 410 and PA system 415 (e.g., associated with a common class of PA system 410 and PA system 415, such as opposed to a unique instance of a PA system) in a single configuration user input.

Figure 5A:
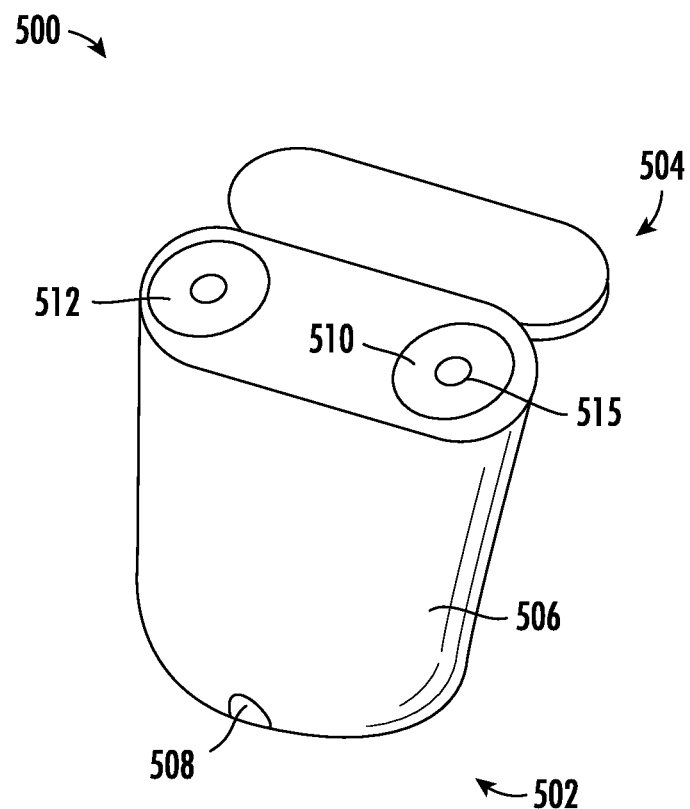
FIG. 5A depicts an example peripheral device according to example aspects of the present disclosure.
Figure 5B:
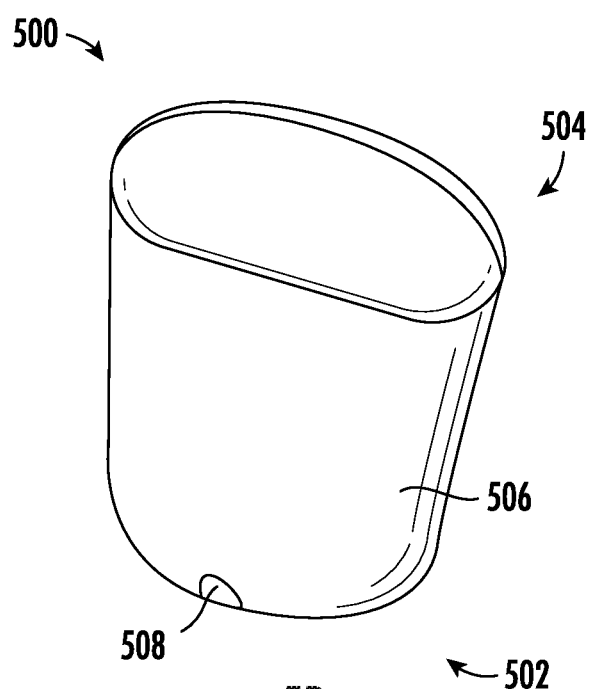
FIG. 5B depicts an example peripheral device according to example aspects of the present disclosure.

FIG. 5A depicts a view of an example peripheral device 500 according to example embodiments of the present disclosure. For instance, peripheral device 500 can be or can include a case for wireless earphones, such as a charging case. Peripheral device 500 can include a body portion 502 and a cover portion 504. Peripheral device 500 can additionally include cavities 510 and 512 in body portion 502. For instance, cavities 510 and 512 can be configured to receive and/or store wireless earphones, such as each receiving one of a pair of wireless earphones. Cover portion 504 can be configured to cover cavities 510 and/or 512, such as for storage, securing of wireless earphones, prevention of damage (e.g., cosmetic damage) to wireless earphones, etc. For example, FIG. 5B depicts another view of example peripheral device 500. As depicted in FIG. 5B, the cover portion 504 can be moved from an open position as in FIG. 5A to a closed position in FIG. 5B, in which the cavities 510 and 512 (and/or wireless earphones positioned in the cavities 510, 512) are covered by cover portion. Other suitable arrangements of cover portions, such as rotating covers, slide covers, detachable covers, etc. can be employed in accordance with example aspects of the present disclosure.

The peripheral device 500 can include a touch-sensitive surface 506. For instance, the touch-sensitive surface 506 can include one or more components that are receptive to user inputs, such as gestures. For example, the touch-sensitive surface 506 can be or can include capacitive, piezoelectric, infrared, and/or other suitable configurations of touch-sensitive surface.

In some implementations, the peripheral device 500 can include a sensor 508, such as a camera. For instance, the sensor 508 can include a camera and/or other optical and/or observational sensor that is configured to provide information in a field of view of the sensor 508. In some implementations, the user can point the peripheral device 500 and/or the sensor 508 at an audio source to select a selected audio source. The sensor 508 can define a direction of the peripheral device 500. For example, the sensor 508 can capture data (e.g., visual data) associated with a selected audio source. As one example, in some implementations, a ray defined by a center of a field of view of the sensor 508 can be coplanar with and/or parallel to a plane defining touch-sensitive surface 506. Thus, a user can hold peripheral device 500 and comfortably input gestures on touch-sensitive surface 506 while pointing peripheral device 500.

The peripheral device 500 (e.g., body portion 502 and/or cover portion 504) can have any suitable shape in accordance with example aspects of the present disclosure. For instance, in some implementations, a shape of the peripheral device 500 can be conducive to the peripheral device 500 being held in a hand of the user. For example, the peripheral device can be generally oblong. As another example, a profile of the peripheral device can be generally circular, rectangular, elliptical, etc.

Figure 6:
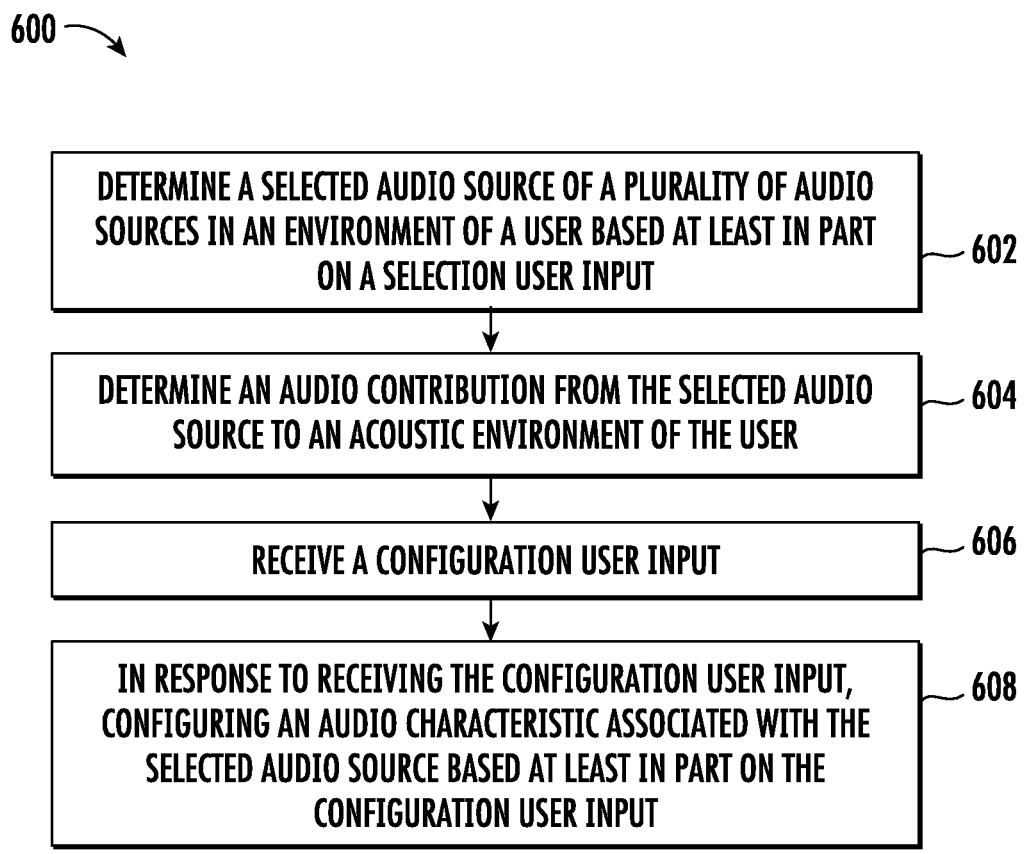
FIG. 6 depicts a flowchart diagram of an example computer-implemented method for providing selective control of an acoustic environment according to example aspects of the present disclosure.

FIG. 6 depicts a flow chart diagram of an example computer-implemented method 600 for selective control of an acoustic environment according to example implementations of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

The computer-implemented method 600 can include, at 602, determining (e.g., by a computing system including one or more computing devices) a selected audio source of a plurality of audio sources in an environment of a user. For example, the selected audio source can be a direction of audio, such as all audio from a particular angular direction, spatial region, etc., and/or a particular audio generating object, class of object, etc. For example, an audio source may be a vehicle, a vehicle class, a person, a person class, an animal, a speaker system, a PA system, etc. The selected audio source can be an audio source (e.g., direction and/or audio generating object) that is selected by the user such that the user can adjust an audio characteristic associated with the selected audio source.

The selected audio source can be determined based at least in part on a selection user input at a peripheral device. The peripheral device can be in communication with the computing system. In some implementations, the peripheral device can be a wireless earphone case, remote, etc. The selection user input can be received at the peripheral device from the user. For example, the selection user input can be or can include one or more gestures, such as swipe gestures, tap gestures, shake gestures, etc. As another example, the selection user input can be or can include a user pointing the peripheral device at the selected audio source.

For instance, the peripheral device can include one or more user interfaces configured to receive user input. As an example, the peripheral device can include one or more touch-sensitive surfaces, such as, for example, a surface configured to receive and/or interpret gestures performed by the user at the touch-sensitive surface. As one example, the selection user input can be or can include a selection gesture, such as, for example, a swipe, shake, tap, double tap, flick, or any other suitable gesture. For instance, in some implementations, determining the selected audio source of the plurality of audio sources can include cycling through the plurality of audio sources. As an example, in some implementations, the user can swipe in one or more directions (e.g., left and/or right) to cycle through a plurality of recognized audio sources in the environment. For example, if the computing system is aware (e.g., through one or more sensors of the computing system, sound isolation and/or classification, etc.) of a plurality of audio sources, the user can cycle through the plurality of audio sources by swiping (e.g., or performing other suitable selection user input) at the peripheral device. As the user cycles through the plurality of audio sources, the user can be provided with visual and/or audial feedback on a current source of the plurality of audio sources. For example, in some implementations, an audial signal describing the current source (e.g., a voice signal descriptive of, for example, a class, direction, and/or other characteristic of the source) can be provided to the user, such as discreetly provided to the user through an audio playback system (e.g., earphones). Additionally and/or alternatively, a visual signal (e.g., text and/or picture(s) describing the source) can be provided on a display screen of a computing device (e.g., a mobile device) of the user.

As another example, the peripheral device can include one or more orientation systems, such as a camera, gyroscopic sensor, etc. The user can interact with the peripheral device using the one or more orientation systems to select a selected audio source. For example, in some implementations, the user can point the peripheral device, such as an indicating portion of the peripheral device, such as a longest dimension of the peripheral device, a marked portion of the peripheral device, etc., such that the peripheral device is directed at the selected audio source. For example, the selection user input can be or can include directing the peripheral device towards the selected audio source.

The computing system can determine the selected audio source based on understanding of the environment of the user. For example, the computing system can identify the selected audio source based on a direction associated with the selected audio source. As an example, in some implementations, such as implementations where the audio source includes directional audio, the computing system can determine that the selected audio source includes all audio from a region indicated by the direction of the peripheral device (e.g., an angular direction based one or more axes defined by, for instance, the user, the ground, a building or other object in the environment, etc.).

For instance, in some implementations, such as prior to selecting the selected audio source, the computing system can determine and/or identify the plurality of audio sources in the environment. For example, the computing system can associate an audio source of the plurality of audio sources with objects and/or features in visual data, isolated and/or separated audio signals, unique audio signals at a directed/directional microphone, etc. For example, in some implementations, multitype data including visual data, directed microphone audio data, etc. can be used to increase confidence (e.g., a confidence score) associated with a predicted audio source.

As another example, in some implementations, such as implementations including one or more cameras, such as a camera on the peripheral device, the computing system can determine a selected audio source based on an object (e.g., a boundary provided by an object classification and/or tracking model) in visual data (e.g., images, video, etc.) from cameras. For example, if the peripheral device includes a camera that is directed towards the selected audio source, the computing system may determine the selected audio source to be the object nearest a center of the visual data (e.g., as indicated by a bounding box surrounding the object). For instance, determining the selected audio source of the plurality of audio sources can include selecting, as the selected audio source, an audio source of the plurality of audio sources that is nearest a center of a field of view of a sensor (e.g., of a peripheral device). As another example, the computing system can determine the selected audio source by comparing a direction indicated by the peripheral device to visual and/or audial data from sensors not on the peripheral device, such as sensors on a mobile device, wearable accessory, etc.

Additionally and/or alternatively, in some implementations, the computer-implemented method 600 can include, at 604 determining (e.g., by the computing system) an audio contribution from the selected audio source to an acoustic environment of the user. For example, the computing system can identify an audio contribution, such as an audio signal and/or contribution to an (e.g., aggregate) audio signal. The audio contribution can be an electrical audio signal (e.g., an analog and/or digital information signal), such as a signal from only the selected audio source (e.g., isolated by a sound separation model) and/or an impact of an audio source on an audio signal, such as an audio signal containing data from a plurality of audio sources.

As one example, the computing system can select an audio signal of a plurality of directional audio signals from a directional microphone array based on the selected audio source. For example, a directional audio signal having a direction corresponding to (e.g., nearest) a direction of the peripheral device can be determined as the audio contribution. As another example, a directional audio signal having a direction corresponding to a direction between the peripheral device and selected audio source (e.g., in visual data) can be determined as the audio contribution.

Additionally and/or alternatively, the computer-implemented method 600, at 606 can include receiving (e.g., by the computing system) a configuration user input at the peripheral device. For example, the configuration user input can be or can include a gesture, such as a swipe gesture, tap gesture, shake gesture, and/or any other suitable gesture, and/or combination thereof. The configuration user input can be received by one or more user interface components (e.g., a touch-sensitive surface) of the peripheral device. As an example, in some implementations, a configuration user input can be or can include an up swipe and/or a down swipe gesture. As another example, in some implementations, a configuration user input can be or can include a double tap gesture.

The configuration user input can be indicative of an intent to configure an audio characteristic associated with the selected audio source. For example, the audio characteristic can be a selective filtering level, such as a degree, percentage, etc. of which the selected audio source is filtered, noise cancelled, etc. from the acoustic environment of the user. For example, the acoustic characteristic (e.g., selective filtering level) can be indicative of a relative volume of the selected audio source. As another example, the audio characteristic can be or can include a filter (e.g., a frequency filter), distortion (e.g., frequency distortion), a pause duration, muted status, and/or any other suitable audio characteristic, and/or combination thereof.

Additionally and/or alternatively, the computer-implemented method 600 can include, at 608, in response to receiving the user input, configuring (e.g., by the computing system) the audio characteristic associated with the selected audio source based at least in part on the configuration user input. For example, the configuration user input can be or can include gestures known to the user and/or recognized by the computing system as controlling an audio characteristic in a predictable manner. The computing system (e.g., the user computing device) can process the configuration user input and adjust the audio characteristic based on, for example, a type and/or other characteristics of the configuration user input. As one example, the type of the configuration user input can be indicative of a desired configuration of the audio characteristic. For example, a swipe gesture may be indicative of a desired selective filtering level change. As another example, a double tap gesture may be indicative of a desired mute toggle. The use of a peripheral device can allow for discreet and/or nonobtrusive performance of the configuration user input, such as in addition to increased user convenience, which can increase user comfort and/or efficiency at selectively controlling the user's audio environment.

As one example, it can be known to a user that, for example, an up swipe gesture increases relative volume of (e.g., reduces a noise cancelling level associated with) an audio source and, similarly, a down swipe gesture decreases relative volume of the audio source. Thus, a user wishing to increase relative volume of an audio source in the user's acoustic environment may perform an up swipe gesture and/or a user wishing to decrease relative volume of an audio source in the user's acoustic environment may perform a down swipe gesture. As another example, it can be known to a user that, for example, a double tap gesture will toggle muting and/or unmuting an audio source in the user's acoustic environment, such as while maintaining relative volume upon unmute. Thus, a user wishing to (e.g., temporarily and/or permanently) mute an audio source may perform a double tap gesture as a configuration user input.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

Further, although the present disclosure is generally discussed with reference to computing devices, such as smartphones, the present disclosure is also applicable to other forms of computing devices as well, including, for example, laptop computing devices, tablet computing devices, wearable computing devices, desktop computing devices, mobile computing device, or other computing devices.

What is claimed is:

1. A computer-implemented method for providing selective control of an acoustic environment of a user, the computer-implemented method comprising:
   determining, by a computing system comprising one or more computing devices, a selected audio source of a plurality of audio sources in an environment of a user based at least in part on a selection user input performed at a peripheral device, the peripheral device in communication with the computing system, wherein the selection user input comprises directing the peripheral device toward the selected audio source;
   receiving, by the computing system, data descriptive of a configuration user input performed at the peripheral device, the configuration user input indicative of an intent to configure an audio characteristic associated with the selected audio source; and
   in response to receiving the configuration user input, configuring, by the computing system, the audio characteristic associated with the selected audio source based at least in part on the configuration user input.

2. The computer-implemented method of claim 1, wherein the peripheral device comprises a wireless earphone case.

3. The computer-implemented method of claim 1, wherein the audio characteristic comprises a selective filtering level of the selected audio source, the selective filtering level comprising a degree of noise cancelling performed by an audio playback system.

4. The computer-implemented method of claim 1, wherein the configuration user input comprises a scroll gesture.

5. The computer-implemented method of claim 1, wherein determining the selected audio source of the plurality of audio sources comprises selecting, as the selected audio source, an audio source of the plurality of audio sources that is nearest a center of a field of view of a sensor of the peripheral device.

6. The computer-implemented method of claim 1, wherein determining the selected audio source of the plurality of audio sources comprises cycling through the plurality of audio sources.

7. A computing system configured to provide selective control of an acoustic environment of a user, the computing system comprising:
   a computing device comprising:
      a user interface component configured to receive user input from a user;
      one or more processors; and
      one or more memory devices storing computer-readable instructions that, when implemented by the one or more processors, cause the one or more processors to perform operations, the operations comprising:
         determining a selected audio source of a plurality of audio sources in an environment of the user based at least in part on a selection user input at the user interface component, wherein the selection user input comprises directing a peripheral device toward the selected audio source;
         receiving a configuration user input at the user interface component, the configuration user input indicative of an intent to configure an audio characteristic associated with the selected audio source; and
         in response to receiving the configuration user input, configuring the audio characteristic associated with the selected audio source based at least in part on the configuration user input.

8. The computing system of claim 7, wherein the computing device comprises a mobile device.

9. The computing system of claim 7, wherein the peripheral device comprises a wireless earphone case comprising one or more cavities configured to receive one or more wireless earphones.

10. The computing system of claim 9, wherein the one or more cavities are configured to form electrical contact with the one or more wireless earphones when the one or more wireless earphones are inserted into the one or more cavities.

11. The computing system of claim 7, wherein the one or more user input components comprise one or more touch-sensitive surfaces.

12. The computing system of claim 7, wherein the audio characteristic comprises a selective filtering level of the selected audio source, the selective filtering level comprising a degree of noise cancelling.

13. The computing system of claim 7, wherein the computing device comprises one or more orientations systems defining a direction of the computing device, and wherein the selection user input comprises directing the direction of the computing device toward the selected audio source.

14. The computing system of claim 7, wherein the one or more orientation systems comprise a sensor, and wherein determining the selected audio source of the plurality of audio sources comprises selecting, as the selected audio source, an audio source of the plurality of audio sources that is nearest a center of a field of view of the sensor.

15. The computing system of claim 7, wherein a type of the configuration user input is indicative of a desired configuration of the audio characteristic.

16. The computing system of claim 7, wherein determining the selected audio source of the plurality of audio sources comprises cycling through the plurality of audio sources.

17. A computing system comprising:
a peripheral device in communication with a user computing device, the peripheral device comprising:
a user interface component configured to receive user input from a user;
one or more processors; and
one or more memory devices storing computer-readable instructions that, when implemented by the one or more processors, cause the one or more processors to perform operations, the operations comprising:
receiving a selection user input from a user wherein the selection user input comprises directing the peripheral device toward the selected audio source;
in response to receiving the selection user input, causing the user computing device to determine a selected audio source of a plurality of audio sources in an environment of the user based at least in part on the selection user input;
receiving a configuration user input at the user interface component, the configuration user input indicative of an intent to configure an audio characteristic associated with the selected audio source; and
in response to receiving the configuration user input, causing the user computing device to configure the audio characteristic associated with the selected audio source based at least in part on the configuration user input.

18. The computing system of claim 17, wherein the peripheral device comprises a wireless earphone case comprising one or more cavities configured to receive one or more wireless earphones.

* * * * *